US007497909B2

(12) United States Patent
Dolin et al.

(10) Patent No.: US 7,497,909 B2
(45) Date of Patent: Mar. 3, 2009

(54) HIGH-REACH INSULATION APPLICATION SYSTEM AND METHOD

(75) Inventors: Timothy A. Dolin, Wheatridge, CO (US); Thomas J. Fellinger, Littleton, CO (US)

(73) Assignee: Johns Manville, Denver, CO (US)

( * ) Notice: Subject to any disclaimer, the term of this patent is extended or adjusted under 35 U.S.C. 154(b) by 406 days.

(21) Appl. No.: 11/314,462

(22) Filed: Dec. 21, 2005

(65) Prior Publication Data

US 2007/0141248 A1 Jun. 21, 2007

(51) Int. Cl.
*B05C 19/00* (2006.01)
*B05B 13/06* (2006.01)
*B05B 3/00* (2006.01)
*B65G 53/40* (2006.01)

(52) U.S. Cl. ....................... 118/308; 118/317; 118/323; 406/164

(58) Field of Classification Search ................. 118/308, 118/317, 306, 323; 427/476, 180, 230, 236, 427/427.1; 406/42, 139, 135, 145, 146, 32, 406/164, 65, 52
See application file for complete search history.

(56) References Cited

U.S. PATENT DOCUMENTS 4,504,525 A * 3/1985 Bellafiore ................... 427/230
2006/0118038 A1 * 6/2006 Bowman et al. ............ 118/100

* cited by examiner

*Primary Examiner*—Yewebdar T Tadesse
(74) *Attorney, Agent, or Firm*—Robert D. Touslee

(57) ABSTRACT

This invention relates generally to the application of a sprayed insulation mixture, and more particularly to an apparatus and method for applying the sprayed mixture in high reach areas of extended elevation and removing any excess mixture therefrom. In one embodiment of a system for spraying an insulation mixture into a cavity and removing any excess mixture therefrom, the system preferably comprises a lift defining upper end lower ends, with the upper end of the lift being adjustably movable between lowered and raised positions. An insulation applicator is located on the lift proximal to the upper end for spraying the insulation mixture into the cavity. The applicator may be rotatably connected to the lift and driven to move in a reciprocating, sweeping motion. A scrubber is also located on the lift, preferably above the applicator, for removing or scrubbing any excess insulation from the cavity. A vacuum inlet is preferably located on the lift below the applicator for receiving any stray or "fly-off" insulation from the applicator and the excess insulation removed from the cavity by the scrubber. A gauge may also be located on the lift for maintaining a predetermined spray distance between the applicator and the cavity. A driven elevation mechanism is operably associated with the lift for adjustably moving the upper end of the lift between the lowered and raised positions. A control is operably associated with the insulation applicator, scrubber, vacuum inlet and driven elevation mechanism to control the function of each component.

19 Claims, 13 Drawing Sheets

FIG. 3
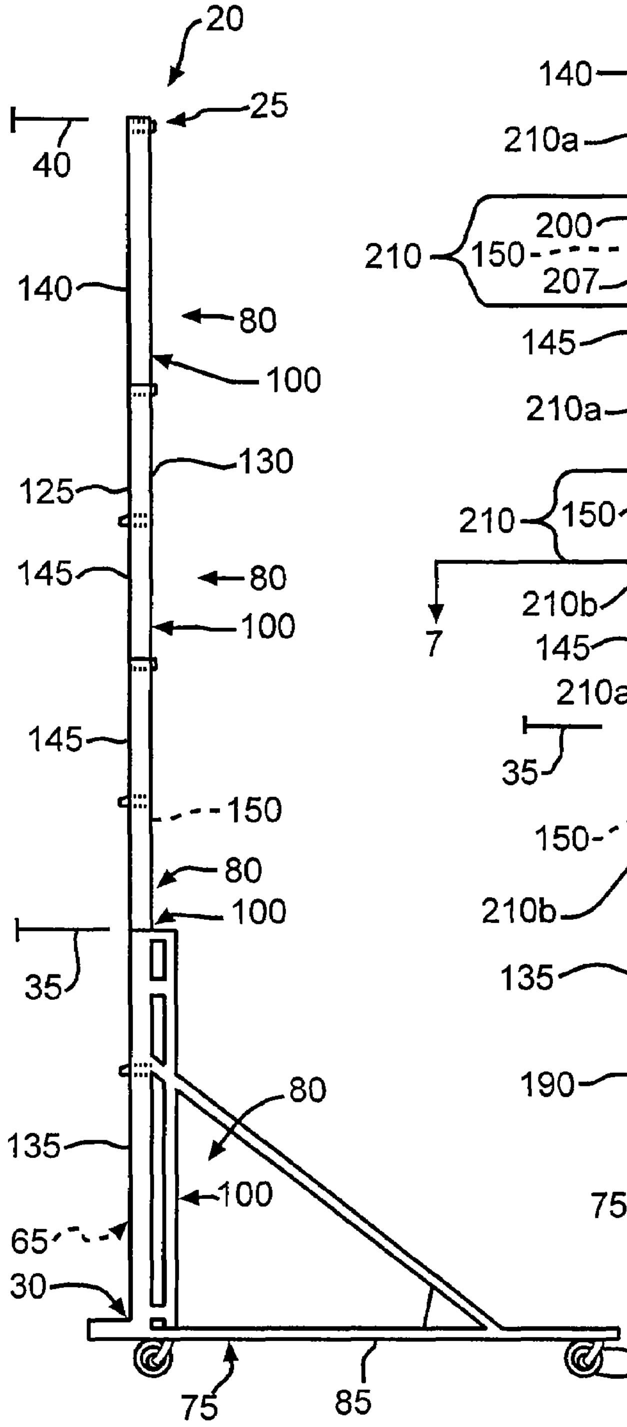
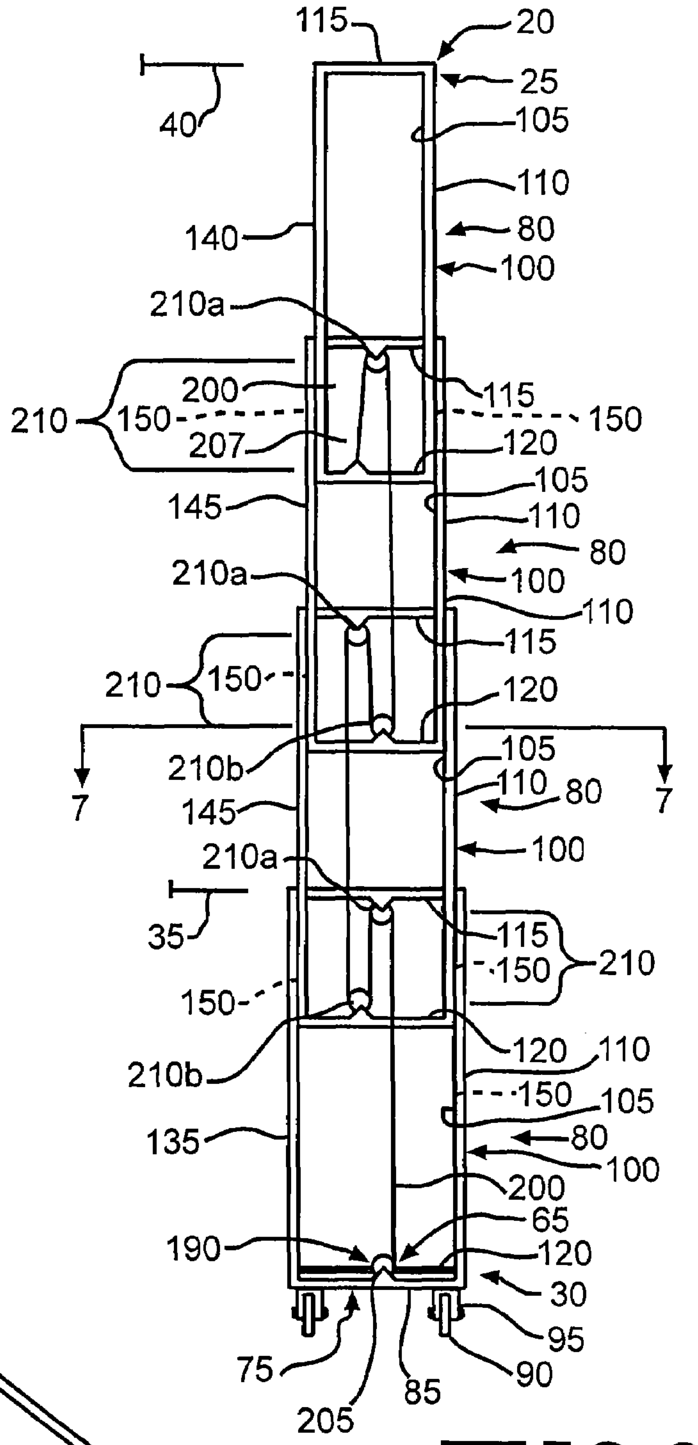
FIG. 2

FIG. 5
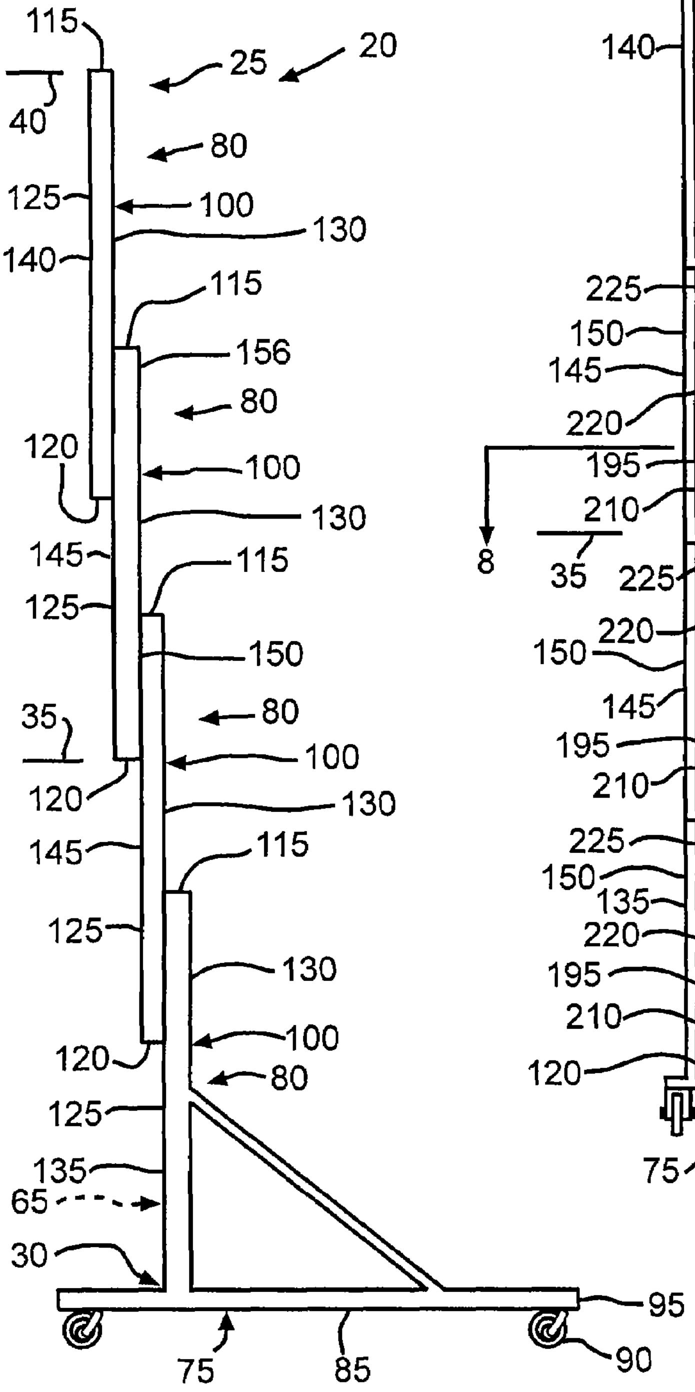
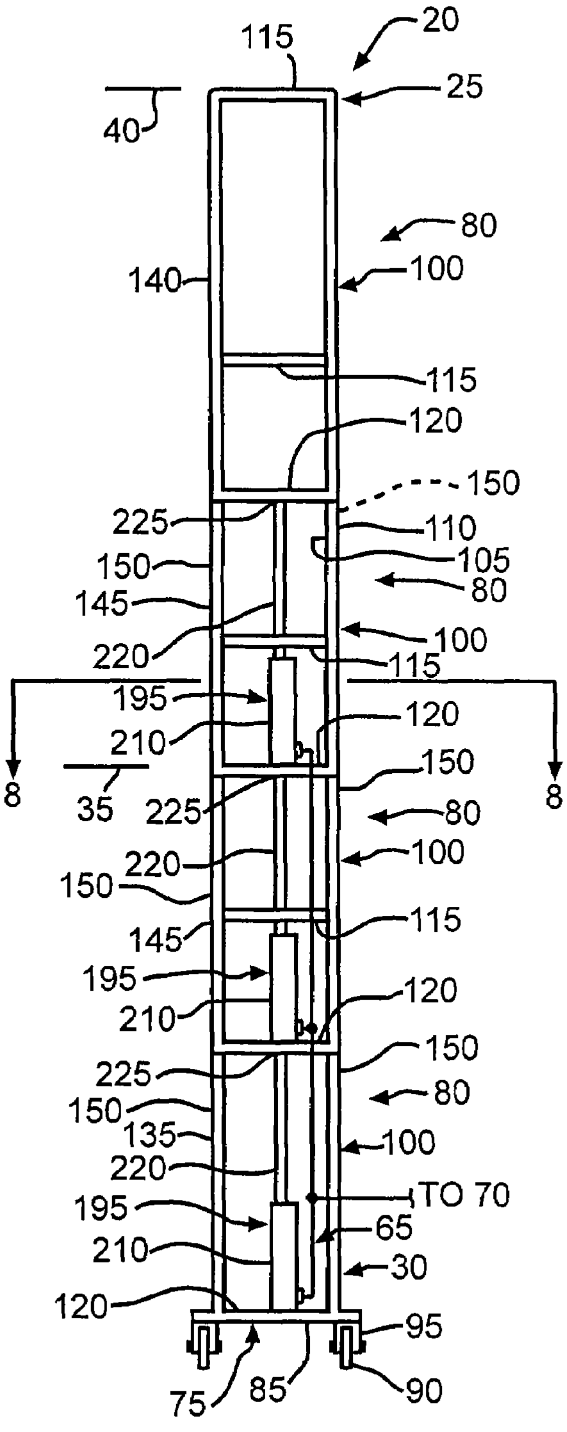
FIG. 4

FIG. 10B
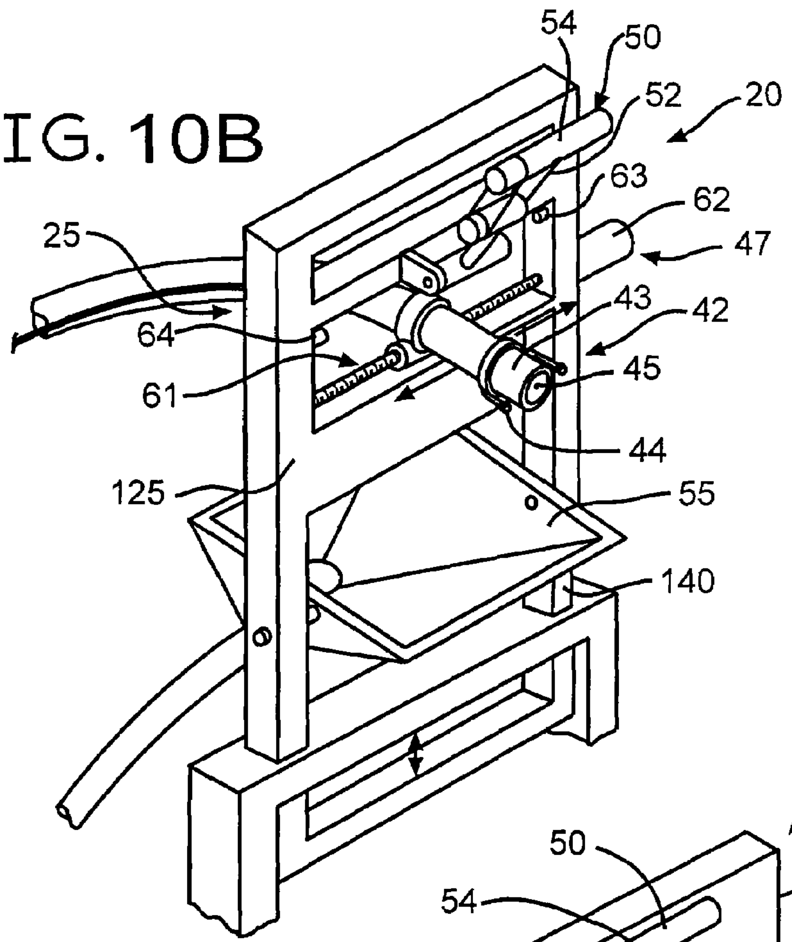
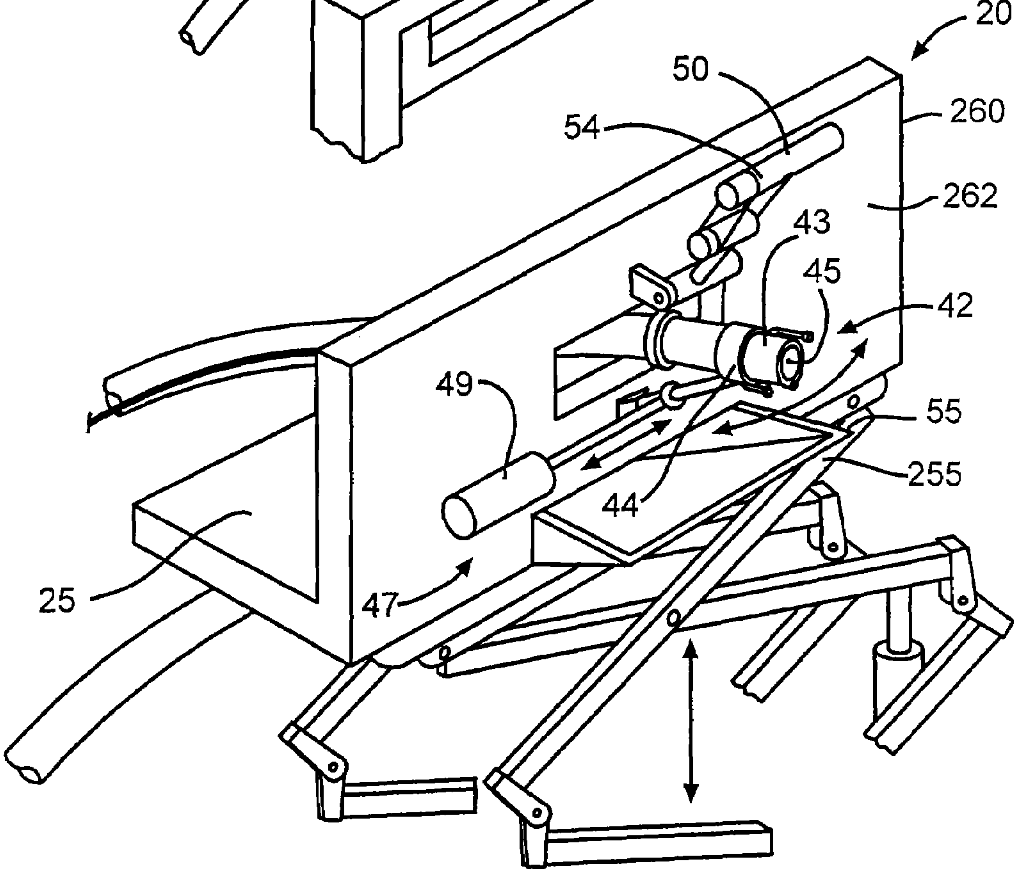
FIG. 10C

| COMPONENT | STATUS |
|---|---|
| lift elevation mechanism | ascend |
| applicator blower and pump | energized |
| optional applicator reciprocating drive | energized |
| scrubber | de-energized |
| vacuum fan | energized |

| COMPONENT | STATUS |
|---|---|
| lift elevation mechanism | descend |
| applicator blower and pump | de-energized |
| optional applicator reciprocating drive | de-energized |
| scrubber | energized |
| vacuum fan | energized |

| COMPONENT | STATUS |
|---|---|
| lift elevation mechanism | ascend |
| applicator blower and pump | energized |
| optional applicator reciprocating drive | energized |
| scrubber | energized |
| vacuum fan | energized |

| COMPONENT | STATUS |
|---|---|
| lift elevation mechanism | descend |
| applicator blower and pump | de-energized |
| optional applicator reciprocating drive | de-energized |
| scrubber | energized |
| vacuum fan | energized |

HIGH-REACH INSULATION APPLICATION SYSTEM AND METHOD

TECHNICAL FIELD OF THE INVENTION

This invention relates generally to the application of a sprayed insulation mixture, and more particularly to an apparatus and method for applying the sprayed mixture in high reach areas of extended elevation or height.

BACKGROUND OF THE INVENTION

Sprayed insulation is commonly used in the construction industry for insulating the open cavities of building walls, floors, ceilings, attics and other areas. Insulating materials, such as loose fiberglass, rock wool, mineral wool, fibrous plastic, cellulose, ceramic fiber, etc. that is combined with an adhesive or water, are sprayed into such open cavities to reduce the rate of heat loss or gain there-though. The properties of the insulation mixture, comprising insulation combined with the adhesive or water, allow it to adhere to vertical or overhanging surfaces, thus allowing for the application of insulation prior to the installation of wallboard and similar cavity enclosing materials.

Various systems have been devised for the application of spayed insulation mixtures into open cavities. Such systems typically utilize a loose insulation blower that draws loose insulation out of a hopper and pneumatically conveys it through a hose and out of the outlet end of an applicator nozzle. The adhesive that is mixed with the insulation is preferably a liquid adhesive that is sprayed onto the airborne insulation as it leaves the outlet end of the applicator nozzle. The water may also be sprayed onto the insulation when the insulation includes a dry adhesive material within the insulation mix, with the water thereafter activating the adhesive properties of the material. The liquid adhesive or water that is added to the airborne insulation is typically pumped from a reservoir and through one or more spray tips located proximal to the end of the applicator nozzle.

In applying sprayed insulation into open cavities, installers typically manually hold the outlet end of the applicator nozzle towards the open cavity. The installer then sprays the insulation mixture into the cavity until the cavity is filled. To ensure that the cavity is completely filled, an installer typically sprays an excess amount of mixture into the cavity such that an excess quantity of sprayed insulation has accumulated beyond an opening of the cavity defined by the cavity's confining boundaries, i.e. beyond the opening of a wall cavity defined by wall studs. The excess quantity of insulation is then removed or "scrubbed off," utilizing a hand-held scrubber, to define a boundary of the sprayed insulation lying substantially planar at the cavity's opening.

A separate vacuum system is typically utilized to gather the excess insulation that is scrubbed-off or removed from the cavity's opening. In utilizing such a vacuum system, excess or scrubbed-off insulation is gathered or swept into a localized area. The gathered excess insulation is then drawn into the end of a vacuum inlet typically held by an installer. A vacuum fan then draws the excess material into the vacuum inlet and through a vacuum hose, and thereafter deposits the material into a bin or other container.

When applying sprayed insulation to a given open cavity, a preferred application distance is maintained between the outlet end of the applicator nozzle and the cavity for a given R value of insulation to ensure that a predetermined density or consistency of the sprayed insulation is maintained within the cavity. It is thus desirable to maintain a constant application distance during the application of an insulation of given R value. However, because present applicator nozzles are hand-held by the installer without any means for maintaining a constant distance between the nozzle outlet and the cavity to be sprayed, inconsistencies in application distance may occur, thus resulting in insulation applications lacking in uniform density.

Also, in maintaining a desired application distance between the nozzle outlet and the cavity to be sprayed, the installer and hand-held applicator nozzle must thus remain proximal to the cavity opening when spraying the insulation therein. However, maintaining this desired proximity between the installer and cavity is difficult when spraying the insulation into wall or ceiling cavities having an extended height or elevation because such extended elevations (i.e. located beyond about nine feet in height) are typically out of reach of the installer utilizing a hand-held insulation applicator nozzle and hand-held scrubber.

Various stilts, ladders and scaffolding systems are presently utilized by sprayed insulation installers to bring the installers into proximity with elevated cavities openings to be insulated. However, a number of disadvantages are associated with the use the use of such stilts, ladders and scaffolding. For example, their use presents numerous workplace safety hazards because each requires the installer to be elevated (i.e. on the stilts, ladder or scaffold) while spraying the insulation mixture into the elevated cavities or scrubbing the excess mixture therefrom. Thus, when in an elevated position on a ladder or stilts and working with the insulation applicator nozzle or hand-held scrubber, the installer handling the spray equipment is subject to the risk of falling and possible injury. Although the use of scaffolding systems presents less of a falling risk for the installer than stilts or ladders, the risk is nonetheless present while also requiring additional time and expense for transporting, mobilizing and setting-up of the scaffolding at a particular job site.

In addition to the inherent disadvantages associated with the use of stilts, ladders and scaffolding in elevating an insulation installer to a location proximal to an elevated wall or ceiling cavity, disadvantages are also associated with the sprayed insulation system itself, namely the spraying, scrubbing and subsequent vacuuming of the scrubbed excess insulation. Present systems utilizing such spraying, scrubbing and vacuuming procedures are not integrated, thus essentially requiring the execution of three separate procedures using three separate pieces of equipment. While a lone installer can perform each of the three separate procedures, use of a lone installer to perform all of the procedures is generally avoided because the overall execution of the three procedures is labor intensive and exhausting.

For example, the installer, after spraying a given course the insulation with the applicator nozzle, would have to dispose of (i.e. put down) the applicator nozzle and then utilize the hand-held scrubber to remove the excess sprayed insulation. After removing the excess insulation with the hand-held scrubber, the installer would then have to dispose of the scrubber and then utilize the vacuum system to gather the scrubbed, excess insulation. Because use of a lone installer to perform each of these procedures is too labor intensive, three-person teams are typically utilized instead, with each person of the team performing one of the three spraying, scrubbing and vacuuming procedures. However, the use of three-person teams, although less labor intensive for a given installer, results in undesirable additional costs associated by employing two additional installers for a given insulation job.

Thus, what is needed is an integrated, sprayed insulation system that allows an installer to maintain a constant application distance between the applicator nozzle outlet and the cavity to be sprayed. Such a system should also facilitate the application of the sprayed insulation mixture into elevated wall and ceiling cavities and the scrubbing of excess mixture therefrom while avoiding the use of stilts, ladders and scaffolding. The system should also allow a single installer to efficiently perform all three of the spraying, scrubbing and vacuuming procedures in an effort to minimize the labor costs associated with the utilization of three-person teams. The present invention fulfills each of the foregoing needs.

SUMMARY OF THE INVENTION

This invention relates generally to the application of a sprayed insulation mixture, and more particularly to an apparatus and method for applying the sprayed mixture in high reach areas of extended elevation and removing any excess mixture therefrom. In one embodiment of a system for spraying an insulation mixture into a cavity and removing any excess mixture therefrom, the system preferably comprises a lift defining upper and lower ends, with the upper end of the lift being adjustably movable between lowered and raised positions. An insulation applicator is located on the lift proximal to the upper end for spraying the insulation mixture into the cavity. The applicator may be movably connected to the lift and driven to move in a reciprocating, sweeping motion.

In a preferred embodiment, a scrubber is located on the lift above the applicator for removing or scrubbing any excess insulation from the cavity while in another embodiment the applicator is located on the lift above the scrubber. A vacuum inlet is preferably located on the lift below the applicator for receiving any stray or “fly-off” insulation from the applicator and the excess insulation removed from the cavity by the scrubber. A gauge may also be located on the lift for maintaining a predetermined spray distance between the applicator and the cavity. A driven elevation mechanism is operably associated with the lift for adjustably moving at least the upper end of the lift between the lowered and raised positions. A control is operably associated with the insulation applicator, scrubber, vacuum inlet and driven elevation mechanism to control the function of each component.

The lift comprises both a base, located at the lift’s lower end, and a plurality of extenders. Each extender of the plurality is located adjacent to at least one other extender, with adjacent extenders of the plurality movably connected to one another. At least one extender of the plurality is supported by the base while at least one extender of the plurality defines the upper end of the lift. The driven elevation mechanism operably associates the extenders of the plurality to one another to adjustably move the upper end of the lift between the lowered and raised positions.

The base preferably comprises a longitudinal frame located at the lower end of the lift for supporting at least one extender of the plurality, thus providing support for the lift while the lift is in both the lowered and raised positions. In an embodiment, the lift comprises a “ladder lift” wherein each extender of the plurality comprises a stanchion. A lower stanchion is supported by the base while an upper stanchion defines the upper end of the lift. Depending upon the desired height of the overall lift, one or more intermediate stanchions may be located between the lower and upper stanchions.

In one embodiment of the ladder lift, adjacent stanchions are movably connected to one another to define a telescopic relationship while in another embodiment, adjacent stanchions are movably connected to one another to define a parallel relationship. At least one elongated guide is preferably located between each adjacent stanchion of the plurality to enable a translational movement between the stanchions. The at least one guide comprises a common “double V-guide” having engaging sections movably secured to one another to facilitate a translational movement there-between. The ladder lift preferably utilizes a driven elevation mechanism comprising either a motor-driven cable assembly or a plurality of actuators to operably associate the stanchions of the plurality to one another.

In another embodiment, a “scissors lift” is utilized wherein each extender of the plurality comprises an assembly of first and second crossed links. A lower assembly is supported by the base while an upper assembly defines the upper end of the lift and supports a carrier. Depending upon the desired height of the overall lift, one or more intermediate assemblies may be located between the lower and upper assemblies. The elevation mechanism of the scissors lift may comprise at least one motor-driven machine screw or at least one actuator to operably associate the assemblies of the plurality.

In one embodiment of the invention, the applicator, optional drive, scrubber and vacuum inlet are located on the upper stanchion of the lift, preferably proximal to a front surface of the stanchion. In another embodiment, the components are located on the carrier supported by the upper assembly of the lift, preferably proximal to a front surface of the carrier. To ensure a consistent application of the insulation mixture by the applicator, a gauge may be located on the lift for maintaining a predetermined distance between the applicator and cavity. The gauge may comprise an adjustable probe located on the lift, an adjustable toe defined on the base, an adjustable arm utilized on the scrubber or the forward end of the base itself.

The applicator, optional reciprocating applicator drive, scrubber, vacuum inlet and elevation mechanism are operably associated with the control. The control preferably comprises a plurality of switches for operation of at least the foregoing components of the system. In one embodiment, the control is used in a “manual mode” wherein the components are energized and de-energized independently of one another via the independent switches for each. In another embodiment, the control is used in an “automatic mode” wherein the components are each automatically energized and de-energized in relation to the operation of the elevation mechanism.

With regard to either a manual or automatic use of the system, the sprayed insulation mixture is preferably applied to a wall cavity from the lower end of the cavity to the cavity’s upper end (i.e. bottom-to-top). A bottom-to-top application of the sprayed insulation mixture allows the applied mixture to form a solid base within the cavity, thereby building upon that solid base as the applicator moves from the wall cavity’s lower to upper ends. In the preferred embodiment of the invention, any excess mixture is removed from the cavity by the scrubber preferably from the upper end of the cavity to the cavity’s lower end (i.e. top-to-bottom) while in an alternate embodiment the excess mixture is removed from the cavity by the scrubber during the application of the insulation from the lower end of the cavity to the cavity’s upper end (i.e. bottom-to-top).

In use in an application process for the preferred embodiment of the system having the scrubber located on the lift above the applicator, the lift is positioned at the lower end of the wall cavity, with the lift having the applicator, scrubber and vacuum inlet located thereon. During the positioning process, the distance between the applicator and cavity 1 may be gauged with the gauge. The insulation blower and pump and the vacuum fan are energized such that the insulation mixture is sprayed into the cavity with the applicator, with the vacuum inlet receiving any stray or “fly-off” mixture from the applicator, as the applicator, scrubber and vacuum inlet ascend on the lift from the lower end of the cavity to an upper end of the cavity. The optional reciprocating drive may be energized for reciprocating the applicator from side-to-side as the applicator is spraying the insulation mixture into the cavity. During the ascent, the rate of ascent, the flow of adhesive or water to the applicator, and the rate of the side-to-side or sweeping movement of the applicator may be controlled.

Upon reaching the upper end of the cavity, the insulation blower and pump and the optional reciprocating drive are de-energized and the scrubber is energized. Any excess mixture is thus removed from the cavity with the scrubber, with the vacuum inlet receiving the removed mixture, as the applicator, scrubber and vacuum inlet descend on the lift from the upper end of the cavity to the cavity's lower end. During the descent, the rate of descent may be controlled. Upon reaching the lowered position, the lift is repositioned to the lower end of another cavity, and the sequence is repeated for the application of the next insulation course.

In use in an alternate application process for the embodiment of the system having the applicator located on the lift above the scrubber, the lift is again positioned at the lower end of the wall cavity, with the lift having the applicator, scrubber and vacuum inlet located thereon. During the positioning process, the distance between the applicator and cavity may again be gauged with the gauge. The insulation blower and pump and the vacuum fan are energized such that the insulation mixture is sprayed into the cavity with the applicator, with the vacuum inlet receiving any stray or "fly-off" mixture from the applicator, as the applicator, scrubber and vacuum inlet ascend on the lift from the lower end of the cavity to an upper end of the cavity. The optional drive may be energized for reciprocating the applicator from side-to-side as the applicator is spraying the insulation mixture into the cavity. The scrubber is also energized during the ascent such that any excess mixture is removed from the cavity during the ascent, with the vacuum inlet again receiving the removed mixture. During the ascent, the rate of ascent, the flow of adhesive or water to the applicator and the rate of the side-to-side or sweeping movement of the applicator may again be controlled. Upon reaching the upper end of the cavity, the lift 20 and attached components are repositioned to the lower end of another cavity and the sequence is repeated for the application of the next insulation course. However, an optional, subsequent scrubbing operation may be performed wherein any excess mixture remaining after the ascent is removed from the cavity with the scrubber, with the vacuum inlet again receiving any removed mixture.

BRIEF DESCRIPTION OF THE DRAWINGS

FIG. 2 is a front elevation view illustrating one embodiment of the lift;

FIG. 3 is a side elevation view illustrating the embodiment of the lift of FIG. 2;

FIG. 4 is a front elevation view illustrating an alternate embodiment of the lift;

FIG. 5 is a side elevation view illustrating the embodiment of the lift of FIG. 4;

FIG. 10B is a perspective view of the applicator, reciprocating drive, scrubber and vacuum inlet of another embodiment of the invention located on an upper stanchion of the lift;

FIG. 10C is a perspective view of the applicator, reciprocating drive, scrubber and vacuum inlet of another embodiment of the invention located on a carrier of the lift;

DESCRIPTION OF THE PREFERRED EMBODIMENTS

Figure 1:
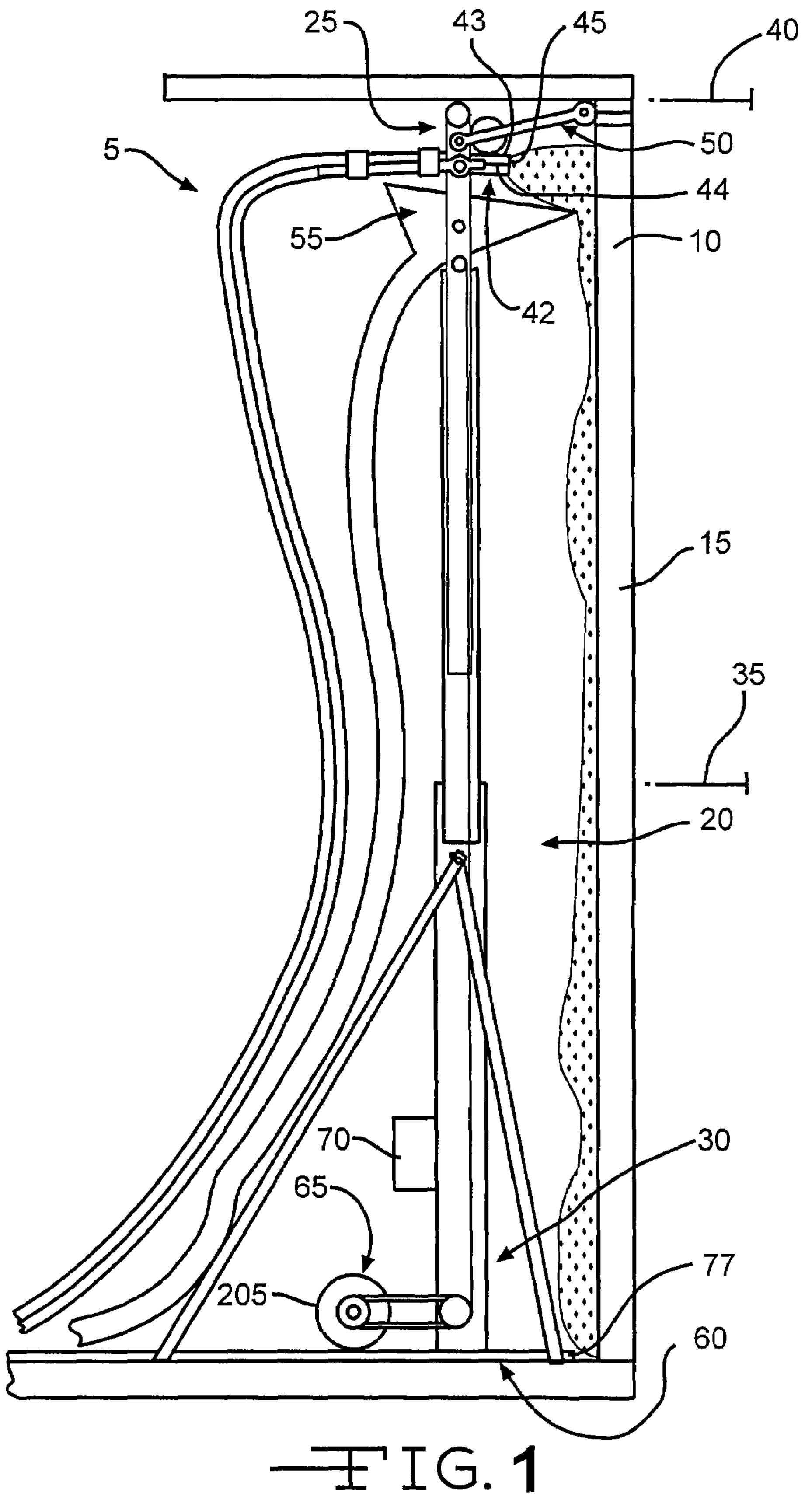
FIG. 1 is a side elevation view illustrating the basic components of one embodiment of the system.

This invention relates generally to the application of a sprayed insulation mixture, and more particularly to an apparatus and method for applying the sprayed mixture in high reach areas of extended elevation and removing any excess mixture therefrom. FIG. 1 illustrates the basic components of one embodiment of a system 5 for spraying an insulation mixture 10 into a cavity 15 and removing any excess mixture therefrom. The system 5 preferably comprises a lift 20 defining upper and lower ends 25 and 30, with the upper end of the lift being adjustably movable between lowered and raised positions 35 and 40. An insulation applicator 42 is located on the lift 20 proximal to the upper end 25 for spraying the insulation mixture 10 into the cavity 15. The applicator 42 may be movably connected to the lift and driven to move in a reciprocating, sweeping motion.

In the preferred embodiment of the invention, a scrubber 50 is also located on the lift 20 above the applicator 42 for removing or scrubbing any excess insulation from the cavity 15. In another embodiment, to be further discussed, the scrubber 50 is located on the lift 20 proximal to the upper end 25 with the applicator 42 located on the lift above the scrubber. In both embodiments, a vacuum inlet 55 is preferably located on the lift 20 below the applicator 42 for receiving any stray or "fly-off" insulation from the applicator and the excess insulation removed from the cavity 15 by the scrubber 50. A gauge 60 may also be located on the lift 20 for maintaining a predetermined spray distance between the applicator 42 and the cavity 15. A driven elevation mechanism 65 is operably associated with the lift 20 for adjustably moving at least the upper end 25 of the lift between the lowered and raised positions 35 and 40. A control 70 is operably associated with the insulation applicator 42, scrubber 50, vacuum inlet 55 and driven elevation mechanism 65 to control the function of each component.

FIGS. 2-5 and 9 illustrate various embodiments of the lift 20, having the applicator, scrubber and vacuum inlet omitted for clarity. In each of these figures, the lift 20 comprises both a base 75, located at the lift's lower end 30, and a plurality of extenders 80. Each extender 80 of the plurality is located adjacent to at least one other extender, with adjacent extenders of the plurality movably connected to one another. At least one extender 80 of the plurality is supported by the base 75 while at least one extender 80 of the plurality defines the upper end 25 of the lift 20. The driven elevation mechanism 65, to be discussed further, operably associates the extenders 80 of the plurality to one another to adjustably move the upper end 25 of the lift 20 between the lowered and raised positions 35 and 40.

The base 75 illustrated within FIGS. 2-5 and 9 preferably comprises a longitudinal frame 85 located at the lower end 30 of the lift 20 for supporting at least one extender 80 of the plurality. Because the base 75 provides support for the lift 20 while the lift is in both the lowered and raised positions 35 and 40, the base defines a footprint of a size necessary to resist forward and rearward moment forces (i.e. tipping forces) created by the weight of the applicator, scrubber and vacuum inlet located at the lift's upper end 25. The base 75 also resists moment forces created by the applicator 42 while blowing the insulation mixture 10 into the cavity 15.

The frame 85 is thus comprised of a rigid material, such as aluminum, steel, fiberglass, plastic, composite materials or other similar materials capable of providing support to the lift 20 and other components located thereon. A plurality of wheels 90 on rotating casters 95 may be located on the frame 85 to facilitate a movement of the lift 20 between locations. Such wheels 90 are preferably lockable to immobilize the lift 20 when located in a desired position.

In an embodiment of the lift 20 illustrated in FIGS. 2-5, a "ladder lift" is disclosed wherein each extender 80 of the plurality comprises a stanchion 100 defining inner and outer side surfaces 105 and 110, upper and lower portions 115 and 120, and front and rear surfaces 125 and 130. A lower stanchion 135 is supported by the base 75 at its lower portion 120 while an upper stanchion 140 defines the upper end 25 of the lift 20. Depending upon the desired height of the overall lift 20, one or more intermediate stanchions 145 may be located between the lower and upper stanchions 135 and 140. While two intermediate stanchions 145 are located between the lower and upper stanchions 135 and 140 of the ladder lift illustrated in FIGS. 2-5, it is understood that additional, fewer, or no intermediate stanchions may be located there-between as well.

Each stanchion is comprised of a material having a rigidity capable of supporting the other stanchions, as well as the applicator, scrubber and vacuum inlet located on the upper stanchion 140. The stanchions 100 are thus preferably comprised of aluminum, steel, fiberglass, plastic, composite materials, or other similar materials having the desired rigidity. In the embodiment of the invention illustrated in FIGS. 2 and 3, the adjacent stanchions 100 movably connected to one another define a telescopic relationship such that a given stanchion has inner and outer side surfaces 105 and 110 respectively located outwardly or inwardly of those surfaces of the at least one adjacent stanchion. In the embodiment illustrated in FIGS. 4 and 5, the adjacent stanchions 100 movably connected to one another define a parallel relationship such that a given stanchion has front and rear surfaces 125 and 130 respectively located either fore or aft of those surfaces of at least one adjacent stanchion.

Figure 6:
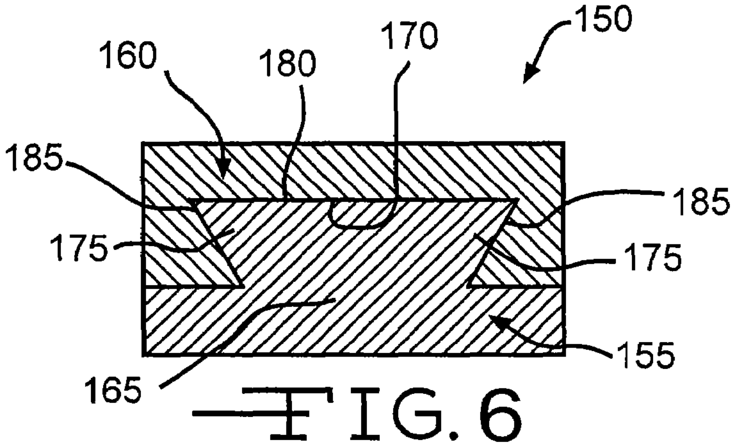
FIG. 6 is a sectional view of the guide.

In defining the foregoing movable connections between stanchions, at least one elongated guide 150 is preferably located between each adjacent stanchion 100 of the plurality to enable a translational movement between the adjacent stanchions. As illustrated in FIG. 6, the at least one guide 150 comprises a common "double V-guide" having engaging sections 155 and 160 movably secured to one another to facilitate a translational movement there-between. Section 155 thus comprises a protuberance 165 defining a lengthwise plane 170 spanning two v-shaped sidewalls 175 while section 160 defines a lengthwise recess 180 located between two angled walls 185. The sections 155 and 160 slidingly engage one another, with the v-shaped sidewalls 175 of the protuberance 165 matingly engaging the angled walls 185 of the recess 180 to prevent the sections from disengaging from one another.

Figure 7:
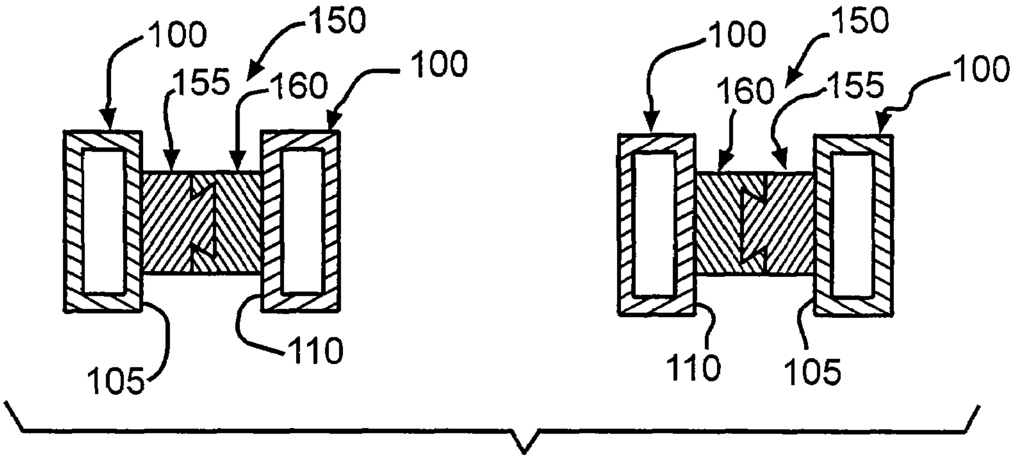
FIG. 7 is a sectional view of the guide and stanchions of FIG. 2.
Figure 8:
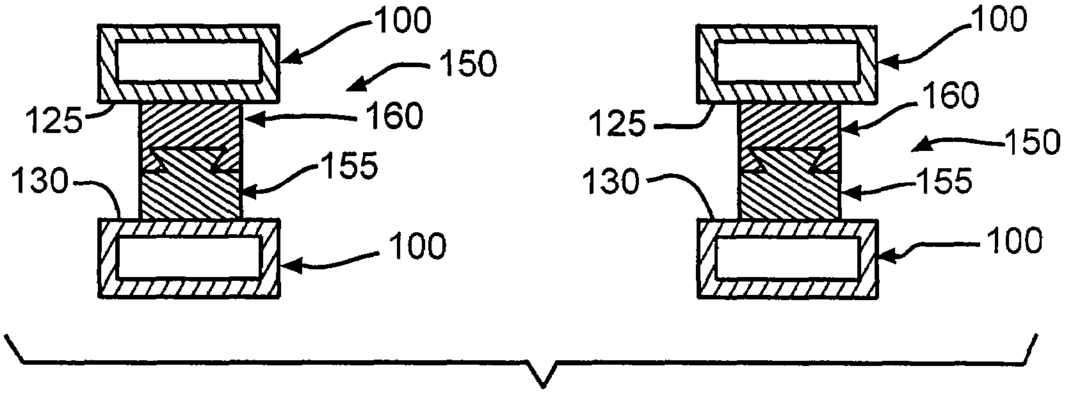
FIG. 8 is a sectional view of the guide and stanchions of FIG. 4.

FIGS. 7 and 8 respectively illustrate cross sections of the lifts of FIGS. 2 and 4 wherein the at least one guide 150 located between adjacent stanchions 100 of the plurality preferably comprises two guides located between the stanchions. Within FIG. 7, the guides 150 are located between the respective inner and outer surfaces 105 and 110 of the adjacent stanchions 100 while in FIG. 8, the guides are located between the stanchion's respective front and rear surfaces 125 and 130. As illustrated therein, each guide section 155 and 160 of a given guide is located on respective surfaces of two movably connected, adjacent stanchions. Each section 155 and 160 may be connected to a given stanchion with common fasteners such as screws, bolts, etc., or with welds or other bonding means as well. Thus, in FIG. 7, section 155 is located on inner side surfaces 105 of a given stanchion 100 while section 160 is located on the respective outer side surfaces 110 of the connected adjacent stanchion. In FIG. 8, section 155 is located on the rear surface 130 of a given stanchion 100 while section 160 is located on the front surfaces 125 of the connected adjacent stanchion. It is understood, however, that the location of the sections 155 and 160 on the respective surfaces can be reversed and not affect the operation of the guides 150.

The lift 20 preferably utilizes a driven elevation mechanism 65 comprising either a motor-driven cable assembly 190 or a plurality of actuators 195 to operably associate the stanchions 100 of the plurality to one another. Referring again to FIG. 2, the lift 20 utilizes the motor-driven cable assembly 190 to operably associate the stanchions 100 of the plurality. As illustrated therein, the motor-driven cable assembly 190 comprises a cable 200 connected between the upper stanchion 140 and a motor-driven spool or cable reel 205 (illustrated in detail in FIG. 1). The reel 205 moves the cable 200 through a series of opposing pulley pairs 210 to vary the length of the cable between the reel and upper stanchion 140.

The motor-driven reel 205 is located at the lower end 30 of the lift 20 while each opposing puller pair 210 of the series operably associates connected, adjacent stanchions 100. The motor-driven reel 205, a common device understood in the art, is operable to rotate in both forward and reverse directions. The forward and reverse directions of the reel may be accomplished via the use of a reversible, electric motor or via the use of a gear system or transmission located between the motor and reel. Although FIGS. 1 and 2 illustrate the motor-driven cable reel 205 as located on the base 75 of the lift 20, it is understood that the reel may be located on the lower stanchion 135 as well.

The reel 205 moves the cable 200 through the opposing pulley pairs 210 to operably associate the connected, adjacent stanchions 100. The opposing pulleys **210*a* and 210*b* of each pair 210 are located on respective upper and lower portions 115 and 120 of the connected, adjacent stanchions 100, with the respective pulley pairs operably associating the respective stanchions. The cable 200 thus runs through the opposing pulleys 210*a* and 210*b* of each pulley pair 210, with one end of the cable connected to the motor-driven reel 205 and the opposite end 207 of the cable connected to the lower portion 120 of the upper stanchion 140**.

Thus, when the motor-driven reel 205 is actuated to draw in the cable 200, the length of the cable between the reel and upper stanchion 140 is progressively shortened. A shortening of the cable's length causes the opposing pulleys 210*a* and 210*b* of each pair 210 to be drawn together to move the respective upper and lower portions 115 and 120 of the respective adjacent stanchions 100 towards one another, resulting in an elevation of each stanchion and a raising of the upper stanchion 140 defining the upper end 25 of the lift 20.

A lengthening of the cable 200 between the reel 205 and the upper stanchion 140 will conversely allow the opposing pulleys 210*a* and 210*b* of each pair 210 to be spread apart, via the weight of each stanchion, thus allowing the respective upper and lower portions 115 and 120 of the respective adjacent stanchions 100 to move away from one another. As the respective upper and upper and lower portions 115 and 120 of the connected adjacent stanchions 100 move away from one another, the elevation of each stanchion will be reduced to lower the upper stanchion 140 defining the upper end 25 of the lift 20.

Referring again to FIG. 4, an embodiment of the lift 20 utilizing a plurality of actuators 195 to operably associate the stanchions 100 of the plurality is illustrated. As illustrated therein, each actuator 195 of the plurality is located between respective lower portions 120 of the respective connected, adjacent stanchions 100. Each actuator 195, a common device understood in the art, comprises a cylinder 210 which uses a fluid to drive a rod 220 inwardly and outwardly in relation to the cylinder. Because the actuators 195 may be either hydraulically or pneumatically driven, the fluid driving the respective rods may thus comprise either a gas, such as air driven by a compressor, or a liquid, such as hydraulic fluid driven by a pump.

Each cylinder 210 of each actuator 195 is preferably located on the lower portion 120 of a given stanchion 100, with the rod 220 having a driven end 225 connected to the lower portion of the connected, adjacent stanchion. Each actuator 195 is preferably connected to a common air compressor or hydraulic pump such that the rods 220 of the actuators are driven simultaneously upon actuation of the compressor or pump. Similarly, each actuator 195 is controlled by the control 70, to be discussed further, such that the rod 220 of each actuator will retract into the respective cylinder 210 when the control allows the fluid to be released from each cylinder.

Thus, when the air compressor or hydraulic pump is actuated, the air or fluid is forced into the cylinder 210 to drive the rod 220 upwardly against the lower portion 120 of the connected adjacent stanchion 100, thus raising the elevation of each stanchion to raise the upper stanchion defining the upper end of the lift. A release of air or fluid from within the cylinders 210 via the control 70, to be further discussed, will cause the rod 220 of each actuator 195 to retract into the respective cylinder, thus lowering the elevation of each stanchion to lower the upper stanchion 140 defining the upper end 25 of the lift 20.

Although FIG. 2 illustrates the motor driven cable assembly 190 as utilized with a lift having stanchions in telescopic relation and FIG. 4 illustrates the plurality of actuators 195 as used with a lift having stanchions in parallel relation, it is understood that each elevation mechanism may be used with either lift. It is further understood that other elevation mechanisms understood in the art may be used to operably associate the stanchions as well, to include machine screws or other gearing.

Figure 9:
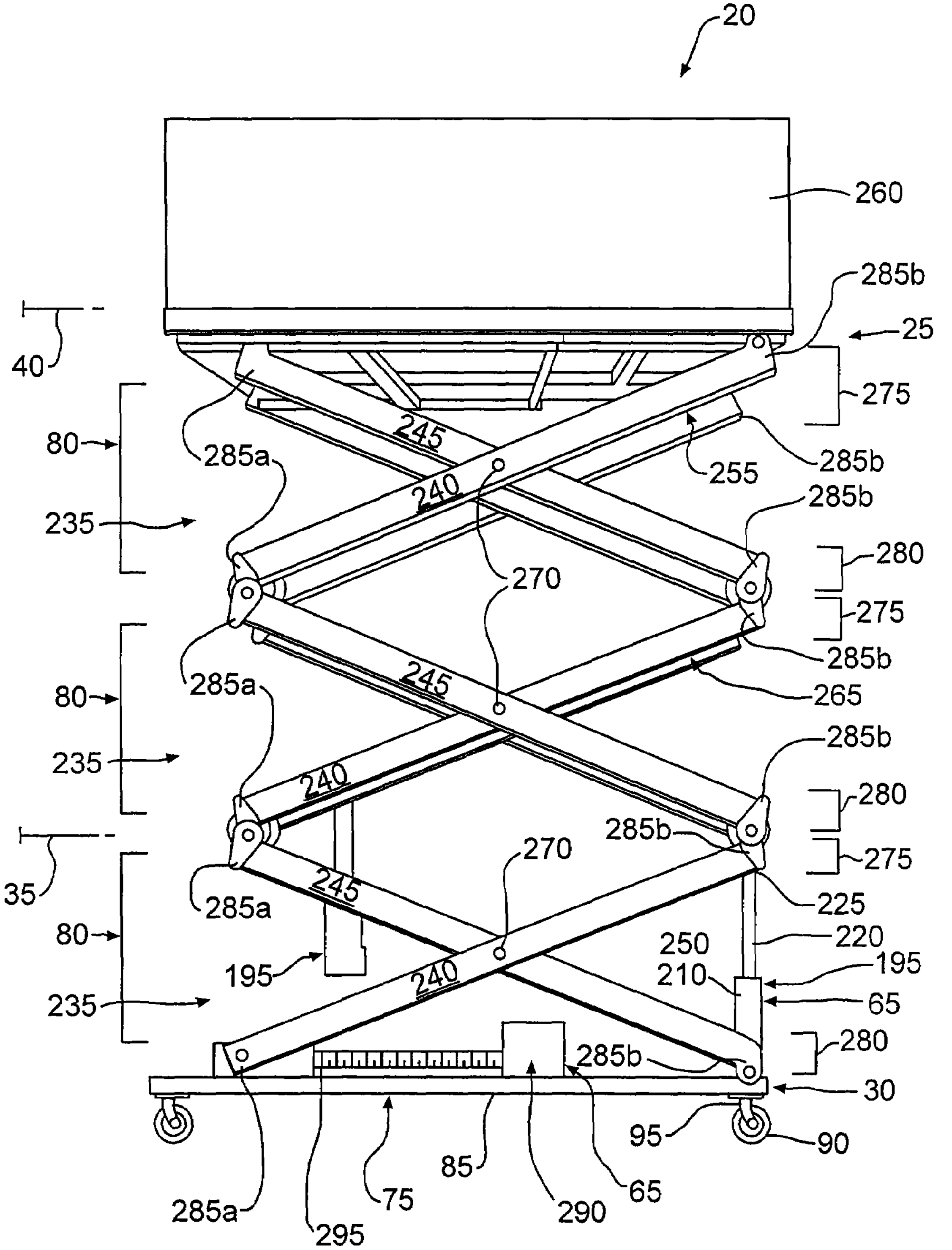
FIG. 9 is a side perspective view illustrating yet another alternate embodiment of the lift.

In the embodiment of the lift 20 illustrated in FIG. 9, a "scissors lift" is utilized wherein each extender 80 of the plurality comprises an assembly 235 of first and second crossed links 240 and 245. A lower assembly 250 is supported by the base 75 while an upper assembly 255 defines the upper end 25 of the lift 20 and supports a carrier 260. Depending upon the desired height of the overall lift, one or more intermediate assemblies 265 may be located between the lower and upper assemblies 250 and 255. While one intermediate assembly 265 is illustrated in FIG. 9, it is understood that additional, fewer, or no intermediate assemblies may be located there-between.

The first and second crossed links 240 and 245 of each assembly 235, preferably comprised of aluminum, fiberglass, steel, composite materials or similar materials, are rotatably connected to one another at a midpoint 270 and define upper and lower sets 275 and 280 of laterally opposing link ends 285*a* and 285*b*. The link ends 285*a* and 285*b* of at least one set of each assembly 235 of the plurality are rotatably connected to the link ends of the at least one adjacent assembly. Thus, if a given assembly 235 is located adjacent to two assemblies (i.e. the intermediate assembly 265 located between upper an lower assemblies 255 and 250), the upper and lower sets 240 and 245 of opposing link ends 285*a* and 285*b* of that assembly are rotatably connected to the link ends of the respective adjacent assemblies. However, if a given assembly 235 is located adjacent to only one assembly, i.e., the lower assembly 250 supported by the base 75 or the upper assembly 255 defining the upper end 25 of the lift 20, that assembly will have only one set of link ends 285*a* and 285*b* (i.e. an upper or lower set of link ends) rotatably connected to the link ends of the adjacent assembly.

For example, the lower assembly 250 supported by the base 75 has the lower set 280 of link ends 285*a* and 285*b* operably associated with the base 75 and the upper set 275 of link ends rotatably connected to the respective link ends of the adjacent assembly located above it. Similarly, the upper assembly 255 defining the upper end 25 of the lift 20, also supporting the carrier 260 located there-above, has the upper set 275 of link ends 285*a* and 285*b* operably associated with the carrier and the lower set 280 of link ends rotatably connected to the respective link ends of the assembly located below it.

The elevation mechanism of the embodiment illustrated in FIG. 9 may comprise at least one motor-driven machine screw 290 or at least one actuator 195 to operably associate the assemblies of the plurality. Although only one of the two foregoing drives types is typically utilized for a given lift, FIG. 9 illustrates both drives 195 and 290 in the alternative for the sake of illustration. In the embodiment with the driven elevation mechanism 65 comprising the at least one motor-driven machine screw, the link ends 285*a* of the lower set 280 of at least one assembly 235 of the plurality (i.e. of the lower assembly 250) are threadedly associated with the driven end 295 of the motor-driven screw 290 preferably located on the base 75. Link ends 285*a* of the lower assembly 250 are preferably translatingly associated with the base 75 while link ends 285*b* are rotatably connected thereto.

Thus, a rotation of the motor-driven screw 290 in one direction will draw the link ends 285*a* inwardly while a rotation of the screw in the opposite direction will move the link ends outwardly. Although the driven end 295 of the motor-driven machine screw 290 is illustrated as threadedly associating with link ends 285*a*, it is understood that the driven end could also be associated with link ends 285*b* instead with the link ends 285*b* translatingly associated with the base and 285*a* rotatably associated with the base. It is also understood that a driven screw having opposing threaded ends could be threadedly associated with both link ends 285*a* and 285*b* as well, with each the link end translatingly associated with the base 75.

Inwardly drawing the link ends 285*a* results in the crossed links 240 and 245 of the respective assembly 235 rotating about their midpoint 270 to inwardly draw the other link ends of the other assemblies rotatably connected thereto, resulting in a gain in elevation of each assembly of the plurality to ultimately raise the elevation of the upper assembly 255 defining the upper end 25 of the lift 20. Conversely, outwardly moving the link ends 285*a* results in the crossed links 240 and 245 of the respective assembly 235 rotating about their midpoint 270 in an opposite direction to outwardly move the other link ends of the other assemblies rotatably connected thereto, resulting in a loss in elevation of each assembly of the plurality to ultimately lower the elevation of the upper assembly 255 defining the upper end 25 of the lift 20.

FIG. 9 also illustrates, in the alternative, the driven elevation mechanism 65 comprising at least one actuator 195 operably associating the upper and lower sets 275 and 280 of link ends 285*b* to one another of at least one assembly 235 of the plurality. Again, the at least one actuator 195, a common device understood in the art, may be either hydraulically or pneumatically driven to drive and retract the rod 220 in relation to the cylinder 210. The cylinder 210 of the at least one actuator 195 is preferably located proximal to the lower set 280 of link ends 285*b* while the driven end 225 of the rod 220 is preferably located proximal to the upper set 275 of the link ends.

Thus, when the air compressor or hydraulic pump is actuated to force air or fluid into the cylinder 210 of the at least one actuator 195, the respective rod end 225 is driven upwardly against the upper set 275 of link ends 285*b* to spread the upper set from the lower set 280. A release of air or fluid from within the cylinder 210 via the 70, to be further discussed, will cause the rod end 225 of the at least one actuator 195 to retract into the respective cylinder 210, thus bringing the upper set 275 of link ends 285*b* into proximity with the lower set 280.

A spreading of the upper set 275 of link ends 285*b* from the lower set 280 results in the crossed links 240 and 245 of the assembly 235 rotating about their midpoint 270 to spread other upper and lower sets of link ends of the other assemblies, rotatably connected thereto, resulting in a gain in elevation of each assembly of the plurality to ultimately raise the elevation of the upper assembly 255 defining the upper end 25 of the lift 20. Conversely, bringing the upper set 275 of link ends 285*b* into proximity with the lower set 280 results in the crossed links 240 and 245 of the assembly 235 rotating about their midpoint 270 in an opposite direction to bring the other upper sets of the other assemblies, rotatably connected thereto, into proximity with their respective lower sets, resulting in a loss in elevation of each assembly of the plurality to ultimately lower the elevation of the upper assembly 255 defining the upper end 25 of the lift 20.

Although FIG. 9 illustrates the at least one actuator 195 operably associating upper and lower sets 275 and 280 of link ends 285*b*, it is understood that the actuator can operably associate link ends 285*a* of the sets as well. Also, it is further understood that the at least one actuator 195 may operably associate the cross links of at least one assembly with the cross links of the at least one adjacent assembly. For example, as shown in the alternative within FIG. 9, the at least one actuator 195 may operably associate the second cross link 245 of at least one assembly with the first cross link 240 of at least one adjacent assembly 235. Thus, it is it is understood that, although not illustrated herein, the actuators 195 may operably associate various components of one or more of the assemblies 235 of the lift 20 to raise and lower the lift's upper end 25.

Regardless of the type or location of the elevation mechanism 65 used to raise or lower the assemblies 235 and upper end of the lift 20, the laterally opposing link ends 285*a* and 285*b* of the assemblies of the lift will move in relation to one another during the operation of the elevation mechanism. To facilitate a movement of the lower set 280 of the link ends 285*a* and 285*b* of the lower assembly 250 in relation to the base 75, the lower set of link ends are operably associated with the base. In the embodiment of the invention illustrated in FIG. 9, the link ends 285*b* are rotatably connected to the base 75 while the opposing link ends 285*a* are translatingly associated with the base.

Thus, as the elevation mechanism 65 raises or lowers the lift 20, the link ends 285*b* rotate in relation to the base 75 while the other link ends 285*a* translate on the base respectively towards or away from the rotating links. The operation of the upper set 275 of link ends 285*a* and 285*b* of the upper assembly 255 in relation to the carrier 260 undergoes a similar operation, with the laterally opposing link ends rotating and translating respectively in relation to the carrier. While FIG. 9 illustrates the opposing link ends 285*a* and 285*b* as translatingly associated and rotatably connected, respectively, with the base 75 and carrier 260, it is understood that link ends 285*b* may be translatingly associated with each while ends 285*a* are rotatably connected thereto. Also, although ladder lifts and scissor lifts are described herein, other types of lifts would work equally well in the present application to elevate the applicator, scrubber and vacuum inlet to wall of ceiling cavities located at extended elevations.

Figure 10A:
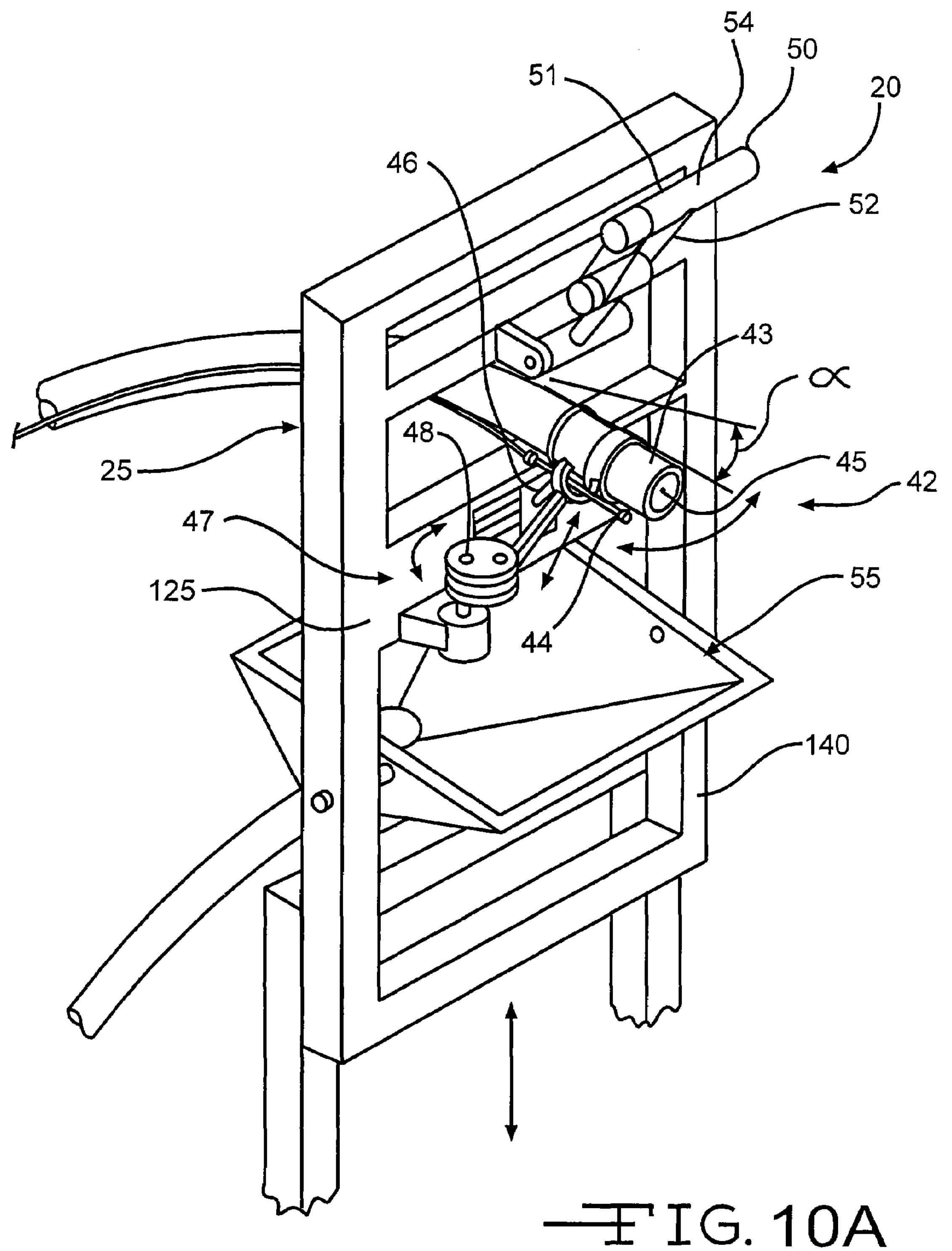
FIG. 10A is a perspective view of the applicator, reciprocating drive, scrubber and vacuum inlet of one embodiment of the invention located on an upper stanchion of the lift.

Referring to FIGS. 10A-10C for a discussion of each of the components elevated by the lift, in the preferred embodiment of the invention, the insulation applicator 42 is located on the lift 20 proximal to the upper end 25, with the scrubber 50 located on the lift above to the applicator. In another embodiment to be further discussed, the scrubber 50 is located on the lift 20 proximal to the upper end 25 with the applicator 42 located on the lift above the scrubber.

In both embodiments, a vacuum inlet 55 is preferably located on the lift 20 below the applicator 42 to receive any stray or "fly-off" insulation from the applicator and the excess insulation removed from the cavity 15 by the scrubber 50.

The applicator 42 preferably comprises an insulation spray nozzle 43 located between a pair of spray tips 44. The nozzle 43 sprays loose insulation out of an outlet end 45 defined therein while the spray tips 44 spray liquid adhesive or water onto the airborne insulation to create the insulation mixture 10. The insulation is moved by a driven blower from an insulation source, such as a hopper, and through an applicator hose to the nozzle 43 of the applicator 42. The liquid adhesive or water is moved by a driven pump from a reservoir and through a liquid hose to the spray tips 44 of the applicator 42. The insulation mixture 10 thus leaves the applicator and is sprayed into a wall or ceiling cavity 15.

The applicator 42 is located on the lift 20 preferably at a slight downward angle $\alpha$ from horizontal to allow the sprayed insulation to pack together and form a solid base within the cavity 15 as the applicator moves from a lower end of the wall cavity to an upper end. The downward angle $\alpha$ (illustrated only in FIG. 10A for clarity) of the applicator 42 is in a range from about 20 degrees to about 70 degrees, preferably from about 30 degrees to about 60 degrees, and optimally from about 40 degree to about 50 degrees.

In the preferred embodiments illustrated in FIGS. 10A-10C, the connection of the applicator 42 to the lift 20 comprises a movable connection such that at least the outlet end 45 and spray tips 44 of the applicator can move side-to-side or sweep in relation to the lift. In the embodiments illustrated in FIGS. 10A and 10C, a pivot 46 is located between the applicator 42 and lift 20 to enable the side-to-side or sweeping movement of at least the outlet end 45 and spray tips 44 of the applicator. The side-to-side or sweeping movement of the may be induced by a drive 47 that drives the at least the outlet end 45 and spray tips 44 of the applicator 42 in a reciprocating motion, with the drive 47 comprising a motor-driven crank 48 (FIG. 10A), a linear actuator 49 (FIG. 10C) or some other similar means.

In the embodiment illustrated in FIG. 10B, a translator 61 may be located between the applicator 42 and lift 20 to enable the side-to-side or sweeping movement of at least the outlet end 45 and spray tips 44 of the applicator. The side-to-side or sweeping movement is again induced by the drive 47 to drive the at least the outlet end 45 and spray tips 44 of the applicator 42 in the reciprocating motion, with the drive 47 comprising a motor-driven machine gear 62 or some other similar means. Limit switches 63 and 64 are preferably located at opposite ends of the machine gear to cause the drive motor to reverse a rotational direction upon a contact from the applicator 42, thus reversing the movement direction of at least the outlet end 45 and spray tips 44 of the applicator on the gear.

In embodiments of the invention illustrated in FIGS. 10A and 10B, the applicator 42 and optional drive 47 are located on the upper stanchion 140 of the lift 20, preferably proximal to a front surface 125 of the stanchion. In another embodiment, as illustrated in FIG. 10C, the applicator 42 and optional drive 47 are located on the carrier 260 supported by the upper assembly 255 of the lift 20, preferably proximal to a front surface 262 of the carrier. Although FIGS. 10A and 10B illustrate embodiments of the drive 47 comprising the motor-driven crank 48 and motor driven machine gear 62 located on the lifts illustrated in FIGS. 4-5 and 2-3, respectively, while FIG. 10C illustrates that the drive 47 comprising the linear actuator 49 located on the lift illustrated in FIG. 9, it is understood that the various embodiments of the drive may be located on any of the various embodiments of the lift 20.

The scrubber 50, preferably comprising a reversible, motor-driven rotary brush or textured wheel 51 located at the end of an arm 52, scrubs excess insulation mixture 10 from the cavity 15. The rotary brush or wheel 51 of the scrubber 50 is preferably driven such that a forward surface 54 of the brush or wheel 51 rotates in the direction of the ascent or descent of the scrubber and other components on the lift 20. Thus, if the scrubber 50 is ascending on the lift 20, the forward surface 54 of the brush or wheel 51 preferably rotates in an upwardly direction. Conversely, if the scrubber 50 is descending on the lift 20, the forward surface 54 of the brush or wheel 51 preferably rotates in a downwardly direction. However, it is understood that the forward surface 54 of the brush or wheel 51 may be driven to rotate in either direction during either an ascent or descent of the scrubber 50 on the lift 20.

In the embodiment illustrated in FIGS. 10A and 10B, the scrubber 50 is located preferably above the applicator 42 on the upper stanchion 140 of the lift 20, preferably proximal to the front surface 125 of the stanchion. In the embodiment illustrated in FIG. 10C, the scrubber 50 is located preferably above the applicator 42 on the carrier 260 supported by the upper assembly 255 of the lift 20, preferably proximal to the front surface 262 of the carrier. Although FIGS. 10A-10C each illustrate the scrubber 50 located on the lift 20 above the applicator 42 in the preferred embodiment of the invention, it is understood that that applicator may be located above the scrubber as well, to be further discussed.

The vacuum inlet 55, preferably comprising a hopper connected to a vacuum hose and vacuum fan, receives any stray or “fly-off” insulation from the applicator 42 and the excess insulation removed from the cavity 15 by the scrubber 50. In the embodiments illustrated in FIGS. 10A and 10B, the vacuum inlet 55 is located preferably below the applicator 42 on the upper stanchion 140 of the lift 20, preferably proximal to the front surface 125 of the stanchion. In the embodiment illustrated in FIG. 10C, the vacuum inlet 55 is located preferably below the applicator 42 on the carrier 260 supported by the upper assembly 255 of the lift 20, preferably proximal to the front surface 262 of the carrier. The location of the vacuum inlet 55 on the lift 20 below both the scrubber 50 and applicator 42 enables the inlet to receive both any stray or fly-off insulation that may fall from the applicator and the removed excess insulation that will fall from the scrubber.

Figure 11:
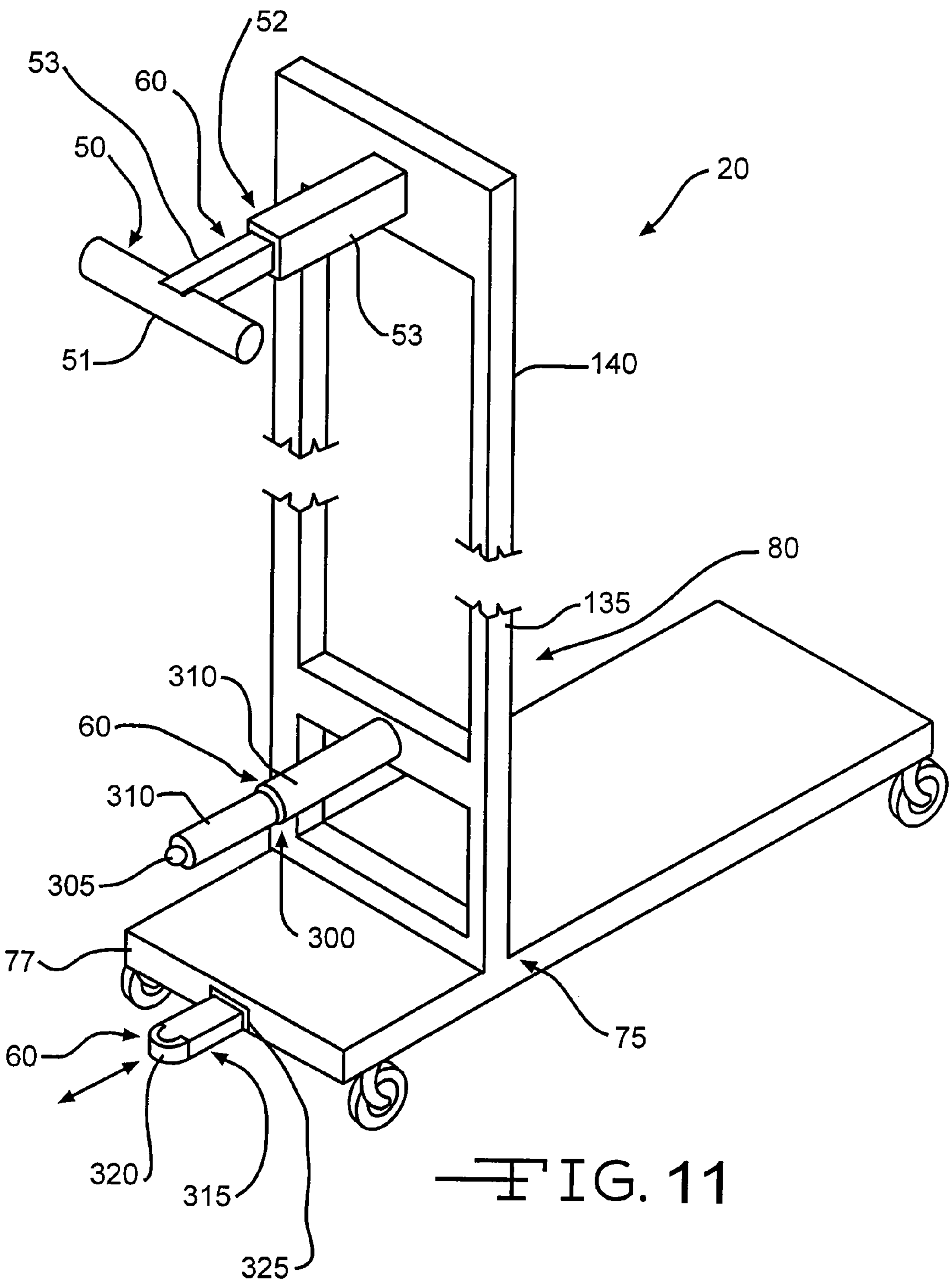
FIG. 11 is a perspective view illustrating various embodiments of the gauge located on the lift.

As illustrated in FIG. 11, to ensure a consistent application of the insulation mixture 10 by the applicator 42, a gauge 60 may be located on the lift 20 for maintaining a predetermined distance between the applicator 42 and cavity 15. A shorter distance between the applicator 42 and wall cavity 15 increases the density or R-value of the sprayed insulation while a longer distance between the two decreases it. Thus, to achieve an R-value of R-13 (1.0 lbs/cu.ft. of insulation density), the applicator 42 is preferably located from about 3 feet to about 4 feet from the cavity 15. To achieve an R-value of R-14 (1.4 lbs/cu.ft. of insulation density), the applicator 42 is preferably located from about 1.5 feet to about 3 feet from the cavity 15. An R-value of R-15 (1.8 lbs/cu.ft. of insulation density) is achieved when the applicator 42 is preferably located from about 1 foot to about 1.5 feet from the cavity 15.

In one embodiment, the gauge 60 comprises a forwardly-directed probe 300 of adjustable length located on the lift 20 and having an end 305 adapted for contact with a wall frame, rear surface of a wall cavity 15 or other structure. As illustrated in FIG. 11, the probe 300 preferably comprises a plurality of fingers 310 in adjustable telescoping relation with one another such that the length of the probe may be set to the desired spray distance between the applicator 42 and cavity 15. The lift 20, having the forwardly-directed probe 300 located thereon, is then moved towards the wall cavity 15 until the end 305 of the probe 300 contacts the wall frame, rear surface of the wall cavity 15 or other structure, thus achieving the desired distance between the applicator 42 and cavity. Although FIG. 11 illustrates the probe 300 connected to the lower stanchion 135 of the lift 20, it is understood that the probe may be connected anywhere on the lift.

In an alternate embodiment illustrated again in FIG. 11, the gauge 60 comprises an adjustable toe 315 defined in a forward end 77 of the base 75 of the lift 20. Similar to the probe 305, the toe is forwardly-directed and has an end 320 adapted for contact with the wall frame, rear surface of the wall cavity 15 or other structure. The toe 315 is adjustably connectable to the base via a sliding engagement with an opening 325 defined in the base’s forward end 77 such that the toe can be adjusted to the desired spray distance between the applicator 42 and wall cavity 15. The lift 20, having the forwardly-directed toe 315 defined in the forward end 77 of the base 75, is then moved towards the wall cavity 15 forward until the end 320 of the toe 314 contacts the wall frame, rear surface of the wall cavity 15 or other structure, thus achieving the desired distance between the applicator 42 and cavity.

In another embodiment illustrated in FIG. 11, the gauge 60 is incorporated into the scrubber 50 located on the upper stanchion 140 such that the length of the arm 52 of the scrubber can be adjusted to the desired spray distance between the applicator 42 and cavity 15. The arm 52 preferably comprises a plurality of sleeves 53 in adjustable telescoping relation with one another such that the length of the scrubber 50 may be set to the desired spray distance between the applicator 42 and cavity 15. The lift 20, having the scrubber 50 located thereon with the arm 52 set to the desired length, is then moved towards the wall cavity 15 forward until the brush or wheel 51 of the scrubber 50 contacts the wall frame, thus achieving the desired distance between the applicator 42 and cavity 15.

In yet another embodiment, the base 75 defines the gauge 60 such that the base's forward end 77 is located forward of the extenders 80 of the lift by a pre-determined distance. Thus, when the forward end 77 of the base 75 is in contact with the wall frame as illustrated in FIG. 1, the desired distance is defined between the applicator 42 and wall cavity 15. Other embodiments may comprise a forwardly-directed laser with accompanying digital indicator located on the lift 20 for indicating the distance of the lift from the wall cavity 15. Although the various embodiments of the gauge 60 are illustrated in FIG. 11 with a lift utilizing stanchions, it is understood that the various embodiments of the gauge are equally applicable to a lift utilizing assemblies as well.

Figure 12:
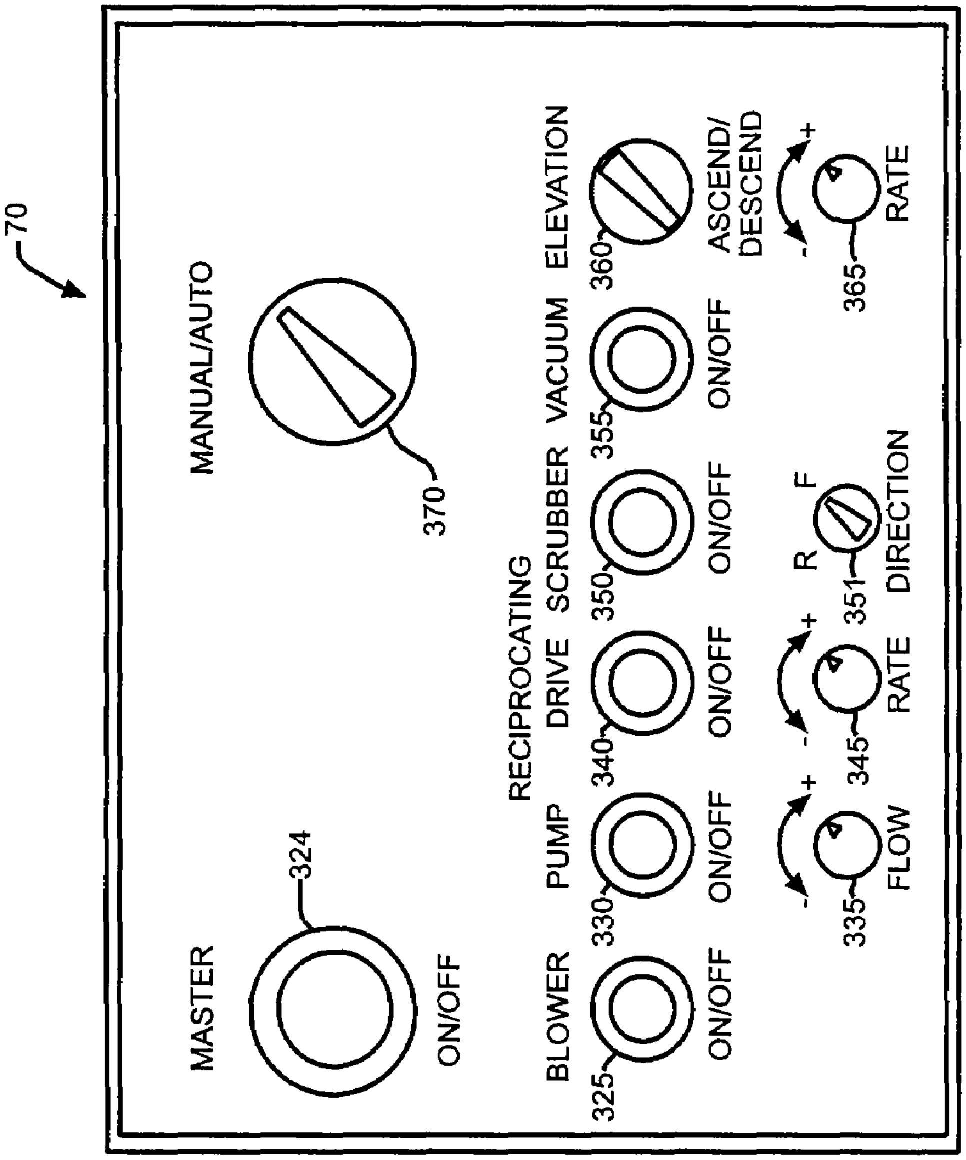
FIG. 12 is a view of one embodiment of the control.

The applicator 42, optional reciprocating applicator drive 47, scrubber 50, vacuum inlet 55 and elevation mechanism 65 are operably associated with the control 70. The control 70, as illustrated in FIG. 12, comprises a plurality of switches for operation of at least the foregoing components of the system 5. The control 70 thus comprises at least a master on/off switch 324 for energizing and de-energizing the system, an insulation blower on/off switch 325 for energizing and de-energizing the blower of the applicator 42, an adhesive or water pump on/off switch 330 and flow control regulator 335 for energizing and de-energizing the pump of the applicator 42 and controlling the flow thereof, respectively, and an applicator reciprocating drive on/off switch 340 and drive rate control switch 345 for energizing and de-energizing the reciprocating drive 47 and controlling the rate of sweep, respectively.

The control 70 further comprises a scrubber motor on/off switch 350 and direction control switch 351 for energizing and de-energizing the scrubber 50 and changing the rotational direction of the forward surface 54 of the brush or wheel 51 between upwardly and downwardly directions, respectively, and a vacuum fan on/off switch 355 for energizing and de-energizing the vacuum fan of the vacuum inlet 55. The pump flow control switch 335 and the reciprocating drive rate control switch 345 preferably utilizes rheostats, stepped rotary switches, variable frequency drive controls, or other controls understood in the art, to control the rate of rotation of the liquid pump motor and of the motor-driven crank 48, the motor-driven machine gear 62 or the linear actuator 49 of the reciprocal drive 47. The scrubber direction control switch 351 utilizes common motor controllers understood in the art to change the direction of the motor-driven scrubber 50.

The control 70 further comprises an ascend/descend switch 360 for the operation of the elevation mechanism 65 of the lift 20 and an ascend/descend rate control switch 365 for controlling the rate of the lift's ascent or descent. For embodiments of the system utilizing a motor-driven reel 205 or a motor-driven machine screw 290 as the elevation mechanism 65, the ascend/descend switch 360 utilizes common motor controllers known in the art to energize and de-energize the motor in forward and reverse directions to thus cause the lift 20 to ascend and descend, respectively. The rate control switch 365 utilizes rheostats, stepped rotary switches, variable frequency drive controls, or other controls understood in the art to control the rate of rotation of the motors for both of these elevation mechanisms to change the respective rates of ascent or descent of the lift 20.

For embodiments of the system utilizing hydraulic or pneumatic actuators 195 as the elevation mechanism 65, the ascend/descend switch 360 utilizes common motor controllers known in the art to energize a hydraulic pump or air compressor motor to create a forward flow of air or hydraulic fluid to the actuators to thus cause the lift 20 to ascend. The ascend/descend switch 360 further utilizes fluid flow regulators or valves understood in the art to permit a backflow of air or hydraulic fluid from the actuators 195 to cause the lift 20 to descend under its own weight. The rate control switch 365 again utilizes fluid flow regulators understood in the art to control the rate of air or hydraulic fluid to and from the actuators 195 to change the respective rates of ascent or descent of the lift 20.

The control 70 may be operated in either a "manual mode" or in an "automatic mode" via an operation of the manual/automatic mode selection switch 370. In the manual mode, the blower and pump for the applicator 42, the optional reciprocating applicator drive 47, the motor for the scrubber 50 and the vacuum fan for the vacuum inlet 55 are each energized, de-energized and/or controlled independent of one another via the independent control switches for each located on the control 70. The elevation mechanism 65 is also controlled independently of the other components in the manual mode to adjust the elevation of the lift 20 via the respective control switches located on the control as well. In the automatic mode, an operation of the ascend/descend switch 360 will result in the automatic energization and/or de-energization of at least the elevation mechanism 65, the blower and pump for the applicator 42, the optional reciprocating applicator drive 47, the motor for the scrubber 50 and the vacuum fan for the vacuum inlet 55 in relation to the operation of the elevation mechanism 65 of the lift 20.

With regard to either a manual or automatic use of the system 5, as illustrated in FIGS. 13-16, the sprayed insulation mixture 10 is preferably applied to a wall cavity 15 from the lower end 16 of the cavity to the cavity's upper end 17 (i.e. bottom-to-top). A bottom-to-top application of the sprayed insulation mixture 10 allows the applied mixture to form a solid base within the cavity 15, thereby building upon that solid base as the applicator 42 moves from the wall cavity's lower to upper ends. In the preferred embodiment of the invention, any excess mixture 10 is removed from the cavity 15 by the scrubber 50, preferably from the upper end 17 of the cavity to the cavity's lower end 16 (i.e. top-to-bottom, FIG. 14), while in an alternate embodiment the excess mixture is removed from the cavity by the scrubber from the lower end of the cavity to the cavity's upper end (i.e. bottom-to-top, FIG. 15).

Figure 13:
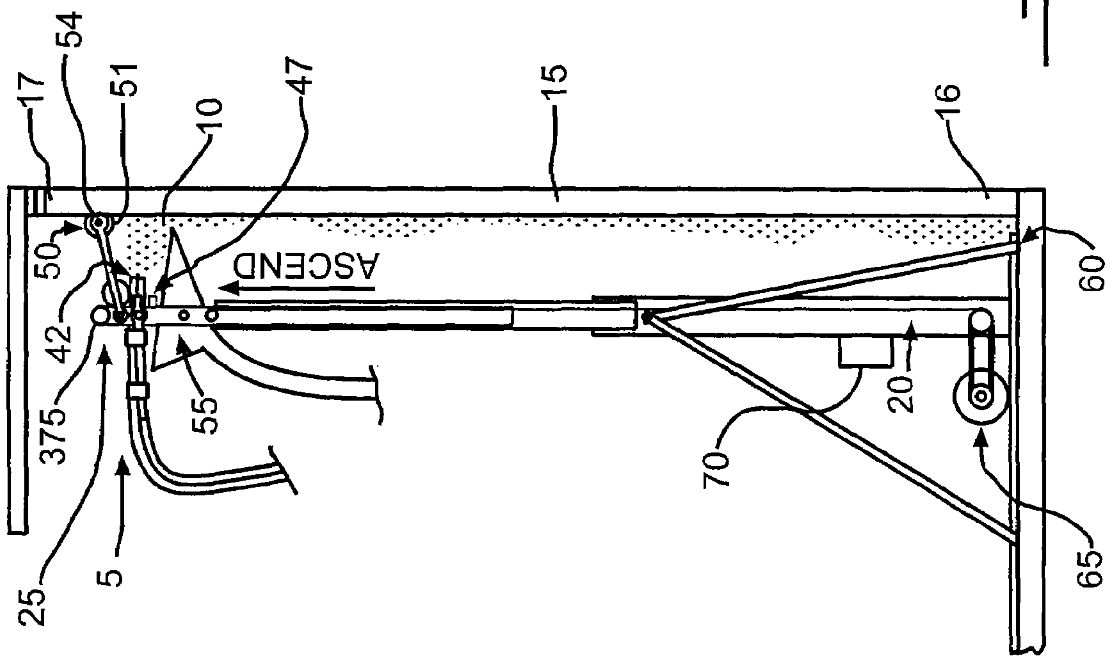
FIG. 13 is a side elevation view illustrating the operation of the components during an ascent of the lift for a system having the scrubber located on the lift above the applicator.
Figure 14:
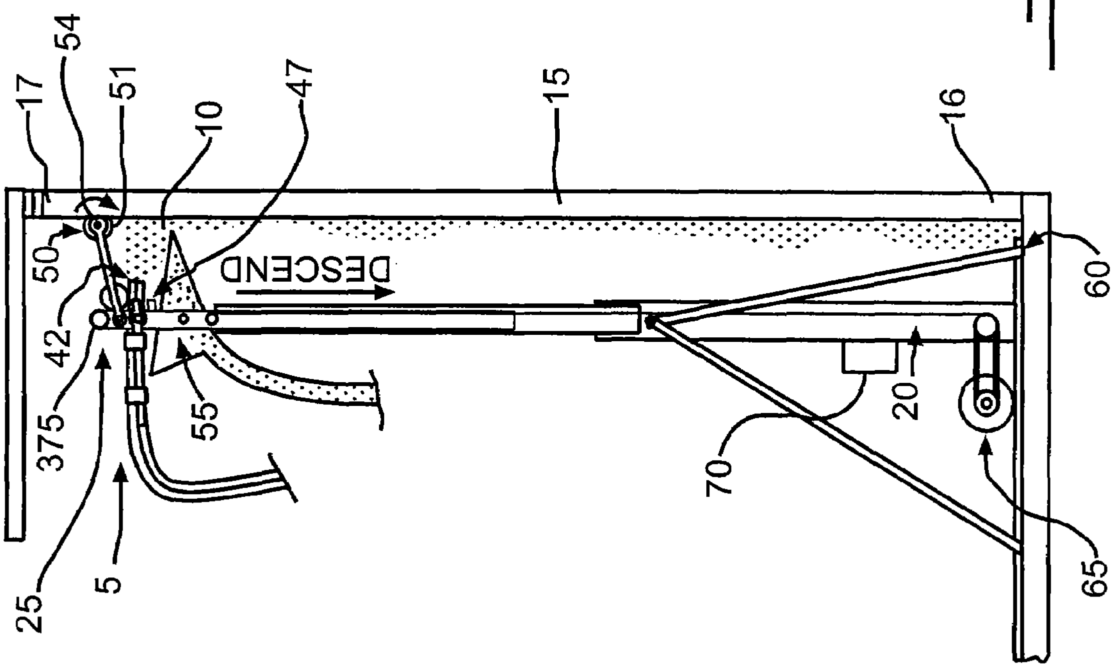
FIG. 14 is a side elevation view illustrating the operation of the components during a descent of the lift for the system having the scrubber located on the lift above the applicator.

FIGS. 13 and 14 illustrate an application process for the preferred embodiment of the system 5 having the scrubber 50 located on the lift 20 above the applicator 42. As illustrated in FIG. 13, the lift 20 is positioned at the lower end 16 of the wall cavity 15, with the lift having the applicator 42, scrubber 50 and vacuum inlet 55 located thereon. During the positioning process, the distance between the applicator 42 and cavity 15 may be gauged with the gauge 60. The insulation applicator blower and pump and the vacuum fan are energized such that the insulation mixture 10 is sprayed into the cavity with the applicator 42, with the vacuum inlet 55 receiving any stray or "fly-off" mixture from the applicator, as the applicator 42, scrubber 50 and vacuum inlet 55 ascend on the lift 20 from the lower end 16 of the cavity to the upper end 17 of the cavity.

The optional reciprocating drive 47 may be energized for reciprocating the applicator from side-to-side such that at least the outlet end 45 and spray tips 44 of the applicator 42 move in a side-to-side or sweeping movement during the ascent as the applicator is spraying the insulation mixture 10 into the cavity 15. During the ascent, the rate of ascent may be controlled to maintain a desired, predetermined application rate. Both the flow of adhesive or water to the applicator 42 and the rate of the side-to-side or sweeping movement of at least the outlet end 45 and spray tips 44 of the applicator may be controlled during the ascent as well.

Upon reaching the upper end 17 of the cavity 15, as illustrated in FIG. 14, the insulation applicator blower and pump and the optional reciprocating drive 47 are de-energized and the scrubber 50 is energized to rotate the forward surface 54 of the brush or wheel 51 preferably in a downwardly direction. Although the forward surface 54 of the brush or wheel 51 preferably rotates in a downwardly direction during the descent, it is understood that it may rotate in an upwardly direction as well. Any excess mixture 10 is thus removed from the cavity 15 with the scrubber 50, with the vacuum inlet 55 receiving the removed mixture, as the applicator 42, scrubber and vacuum inlet descend on the lift 20 from the upper end of the cavity to the cavity's lower end. During the descent, the rate of descent may be controlled to maintain a desired, predetermined scrub rate. Upon reaching the lowered position, the lift 20 is repositioned to the lower end of another cavity, and the sequence is repeated for the application of the next insulation course.

Figure 15:
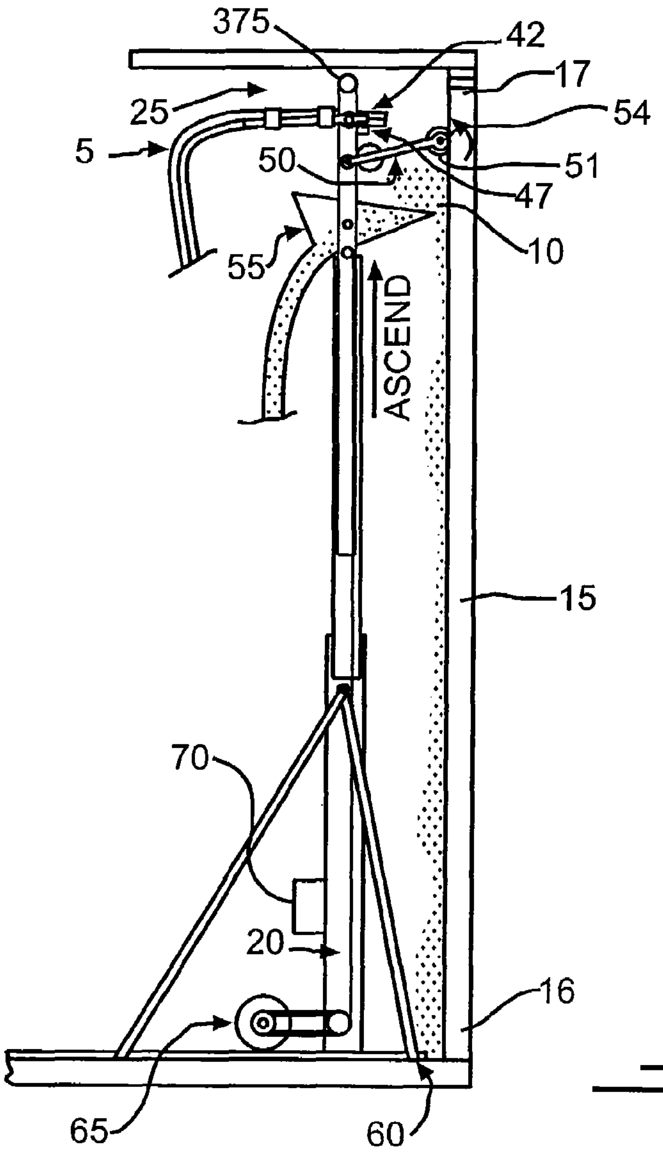
FIG. 15 is a side elevation view illustrating an alternate operation of the components during an ascent of the lift for a system having the applicator located on the lift above the scrubber.
Figure 16:
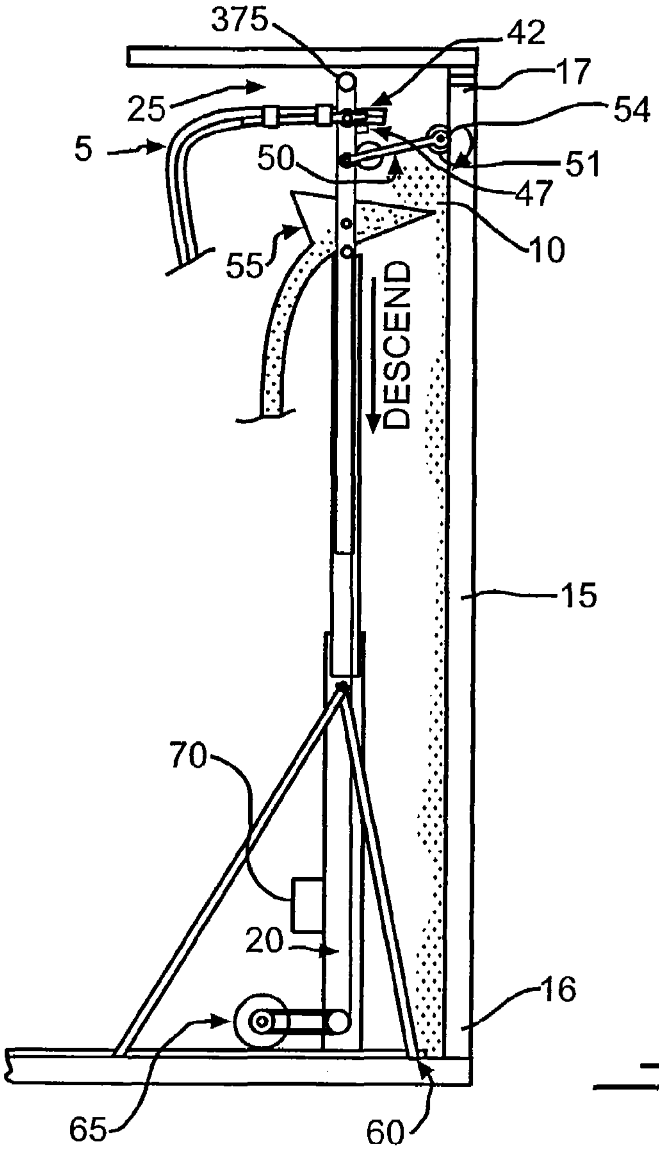
FIG. 16 is a side elevation view illustrating an optional operation of the components during a descent of the lift for the system having the applicator located on the lift above the scrubber.

FIGS. 15 and 16 illustrate an alternate application process for the embodiment of the system 5 having the applicator 42 located on the lift 20 above the scrubber 50. As illustrated in FIG. 15, the lift 20 is again positioned at the lower end 16 of the wall cavity 15, with the lift having the applicator 42, scrubber 50 and vacuum inlet 55 located thereon. During the positioning process, the distance between the applicator 42 and cavity 15 may again be gauged with the gauge 60. The insulation blower and pump and the vacuum fan are energized such that the insulation mixture 10 is sprayed into the cavity with the applicator 42, with the vacuum inlet 55 receiving any stray or "fly-off" mixture from the applicator, as the applicator, scrubber and vacuum inlet ascend on the lift 20 from the lower end 16 of the cavity to an upper end 17 of the cavity. The optional reciprocating drive 47 may be energized for reciprocating the applicator from side-to-side such that at least the outlet end 45 and spray tips 44 of the applicator 42 move in a side-to-side or sweeping movement during the ascent as the applicator is spraying the insulation mixture 10 into the cavity 15. The scrubber 50 is also energized during the ascent to rotate the forward surface 54 of the brush or wheel 51 in preferably an upwardly direction. Although the forward surface 54 of the brush or wheel 51 preferably rotates in an upwardly direction during the ascent, it is understood that it may rotate in a downwardly direction as well. Any excess mixture 10 is thus removed from the cavity 15 with the scrubber 50 during the ascent, with the vacuum inlet 55 again receiving the removed mixture. During the ascent, the rate of ascent may be controlled to maintain a desired, predetermined application and/or scrub rate. Both the flow of adhesive or water to the applicator 42 and the rate of the side-to-side or sweeping movement of at least the outlet end 45 and spray tips 44 of the applicator may also be controlled during the ascent as well.

Upon reaching the upper end 17 of the cavity 15, the lift 20 and attached components are repositioned to the lower end of another cavity and the sequence is repeated for the application of the next insulation course. However, as illustrated in FIG. 16, an optional, subsequent scrubbing operation may be performed whereas the insulation blower and pump and the optional reciprocating drive 47 are de-energized while the scrubber 50 remains energized, but with the forward surface 54 of the brush or wheel 51 rotating preferably in a downwardly direction. Again, although the forward surface 54 of the brush or wheel 51 preferably rotates in a downwardly direction during the descent, it is understood that it may rotate in an upwardly direction as well. Any excess mixture 10 remaining after the ascent is thus removed from the cavity with the scrubber 50, with the vacuum inlet 55 receiving any removed mixture as the applicator, scrubber and vacuum inlet descend on the lift 20 from the upper end of the cavity to the cavity's lower end. During the descent, the rate of descent may be controlled to maintain a desired, predetermined scrub rate. Again, upon reaching the lowered position, the lift 20 is repositioned to the lower end of another cavity and the sequence is repeated for the application of the next insulation course. It is noted that in both embodiments of the system illustrated in FIGS. 13-14 and 15-16, respectively, the system 5 may also be operated with only the scrubber 50 and vacuum fan energized during the ascent such that the system can scrub off any excess insulation material 10 remaining after the completion of any application procedure.

To facilitate the foregoing operation, the components of the system are thus energized and de-energized either manually or automatically with the control 70. After positioning and optionally gauging the lift 20 at the lower end 16 of the cavity 15, the manual mode of the control 70 may be utilized via an operation of the selection switch 370. When in the manual mode for the preferred embodiment of the system 5 having the scrubber 50 located on the lift 20 above the applicator 42 (FIG. 13), the applicator 42 and the optional reciprocating applicator drive 47 are energized via an operation of the respective blower and pump switches 325 and 330 and the optional reciprocating drive switch 340. The adhesive or water flow control regulator 335 may be utilized to control the flow of the adhesive or water to the applicator 42 while the rate control switch 345 for the reciprocating applicator drive 47 may also be utilized to control the rate of the side-to-side or sweeping movement of at least the outlet end 45 and spray tips 44 of the applicator. The vacuum fan is energized via switch 355 to allow the vacuum inlet 55 to receive the stray or fly-off insulation released from the applicator 42 during the ascent of the lift 20. The elevation mechanism switch 360 is operated (i.e. moved to the ascend position) to cause the lift 20 ascend from its lowered position to its raised position, with the ascend/descend rate control switch 365 optionally operated to maintain a desired rate of ascent.

When the upper end 25 of the lift 20 reaches the raised position (i.e. at the upper end of the cavity 15, FIG. 14), the blower and pump for the applicator 42 and the optional reciprocating applicator drive 47 are de-energized via an operation of the switches 325, 330 and 340, respectively. The scrubber motor switch 350 is operated to energize the scrubber 50, with the scrubber direction switch 351 operated as necessary to cause the forward surface 54 of the brush or wheel 51 to rotate preferably in a downwardly direction. The elevation mechanism switch 360 is operated (i.e. moved to the descend position) to cause the lift 20 to descend from the upper end of the cavity 15 to the cavity's lower end. The ascent/descent rate control switch 365 may be operated to maintain a desired rate of descent. During the descent, the vacuum fan remains energized to allow the vacuum inlet 55 to receive the excess insulation removed from the cavity 15 by the scrubber 50.

When in the manual mode for the alternate embodiment of the system 5 having the applicator 42 located on the lift 20 above the scrubber 50 (FIG. 15), the applicator 42 and the optional reciprocating applicator drive 47 are energized via an operation of the respective blower and pump switches 325 and 330 and the optional reciprocating drive switch 340. The adhesive or water flow control regulator 335 may be utilized to control the flow of the adhesive or water to the applicator 42 while the rate control switch 345 for the reciprocating applicator drive 47 may also be utilized to control the rate of the side-to-side or sweeping movement of at least the outlet end 45 and spray tips 44 of the applicator. The scrubber switch 350 is also actuated to energize the scrubber 50, with the scrubber direction switch 351 operated as necessary to cause the forward surface 54 of the brush or wheel 51 to rotate preferably in an upwardly direction. The vacuum fan is also energized via switch 355 to allow the vacuum inlet 55 to receive the stray or fly-off insulation mixture 10 released from the applicator 42 and the excess mixture removed by the scrubber 50 during the ascent of the lift 20. The elevation mechanism switch 360 is operated (i.e. moved to the ascend position) to cause the lift 20 ascend from its lowered position to its raised position, with the ascend/descend rate control switch 365 optionally operated to maintain a desired rate of ascent.

When the upper end 25 of the lift 20 reaches the raised position (i.e. at the upper end of the cavity 15), the applicator 42 and the optional reciprocating applicator drive 47 are preferably de-energized via an operation of the respective blower and pump switches 325 and 330 and the optional reciprocating drive switch 340. The scrubber 50 and vacuum fan of the vacuum inlet 55 are also preferably de-energized via an operation of the respective scrubber and vacuum fan switches switch 350 and 355. The elevation mechanism switch 360 is operated (i.e. moved to the descend position) to cause the lift 20 to descend from the upper end of the cavity 15 to the cavity's lower end and the lift 20 and attached components are repositioned to the lower end of another cavity and the sequence is repeated for the application of the next insulation course. It is understood, however, that various components (i.e. the vacuum fan for the vacuum inlet) may remain energized during the descent and when repositioning the lift.

If an optional, subsequent scrubbing operation is desired (FIG. 16), the blower and pump for the applicator 42 and the optional reciprocating applicator drive 47 are de-energized via an operation of the switches 325, 330 and 340, respectively. The scrubber 50 remains energized with the direction of the forward surface 54 of the brush or wheel 51 of the scrubber preferably changed from an upwardly direction to a downwardly direction via an operation of the direction switch 351. The elevation mechanism switch 360 is operated (i.e. moved to the descend position) to cause the lift 20 to descend from the upper end of the cavity 15 to the cavity's lower end. The ascent/descent rate control switch 365 may be operated to maintain a desired rate of descent. During the descent, the vacuum fan remains energized to allow the vacuum inlet 55 to receive any insulation mixture 10 removed by the scrubber 50 that was remaining after the ascent. After the lift 20 and attached components reach the lowered position, it is repositioned to the lower end of another cavity and the sequence is repeated for the application of the next insulation course.

After positioning and optionally gauging the lift 20 at the lower end of the cavity 15, the automatic mode of the control 70 may be utilized via an operation of the selection switch 370. When in the automatic mode for the preferred embodiment of the system 5 having the scrubber 50 located on the lift 20 above the applicator 42 (FIG. 13), an operation of the ascend/descend control switch 360 to the ascend position will result in an automatic energization of at least the blower, pump and optional reciprocating applicator drive 47 for the applicator 42, and the vacuum fan for the vacuum inlet 55 as the lift ascends from the lower end 16 of the cavity 15 to the cavity's upper end 17. The adhesive or water flow control regulator 335 may be utilized to control the flow of the adhesive or water to the applicator 42 while the rate control switch 345 for the reciprocating applicator drive 47 may be utilized to control the rate of the side-to-side or sweeping movement of at least the outlet end 45 and spray tips 44 of the applicator.

When the upper end 25 of the lift 20 reaches the raised position (FIG. 14), a limit switch 375 preferably located on the lift's upper end is triggered, causing a de-energization of the blower, pump and optional reciprocating drive 47 of the applicator 42 and an energization of the scrubber 50 such that the forward surface 54 of the brush or wheel 51 rotates preferably in a downwardly direction, and further causing the lift to automatically descend while the vacuum fan of the vacuum inlet 55 remains energized. During either the ascent or descent of the lift 20 in automatic mode, the ascent/descent rate control switch 365 may be operated to control the lift's rate of ascent or descent, respectively. After the lift 20 and attached components reach the lowered position, it is repositioned to the lower end of another cavity and the sequence is repeated for the application of the next insulation course.

When in the automatic mode for the alternate embodiment of the system 5 having the applicator 42 located on the lift 20 above the scrubber 50 (FIG. 15), an operation of the ascend/descend control switch 360 to the ascend position will result in an automatic energization of at least the blower, pump and optional reciprocating applicator drive 47 for the applicator 42, the motor for the scrubber 50 such that the forward surface 54 of the brush or wheel 51 rotates preferably in an upwardly direction, and the vacuum fan for the vacuum inlet 55 as the lift ascends from the lower end 16 of the cavity 15 to the cavity's upper end 17. The adhesive or water flow control regulator 335 may be utilized to control the flow of the adhesive or water to the applicator 42 while the rate control switch 345 for the reciprocating applicator drive 47 may be utilized to control the rate of the side-to-side or sweeping movement of at least the outlet end 45 and spray tips 44 of the applicator.

When the upper end 25 of the lift 20 reaches the raised position, the limit switch 375 preferably located on the lift's upper end is triggered, causing an automatic de-energization of the blower, pump and the optional reciprocating drive 47 of the applicator 42, and the vacuum fan for the vacuum inlet 55, and further causing the lift to automatically descend to the lowered position. After the lift 20 and attached components reach the lowered position, it is repositioned to the lower end of another cavity and the sequence is repeated for the application of the next insulation course.

If the optional, subsequent scrubbing operation is desired (FIG. 16) when the upper end 25 of the lift 20 reaches the raised position, the limit switch 375 preferably located on the lift's upper end is triggered, causing an automatic de-energization of the blower, pump and the optional reciprocating drive 47 of the applicator 42, and further causing the lift to automatically descend. During the descent, the scrubber 50 is energized such that the forward surface 54 of the brush or wheel 51 rotates preferably in a downwardly direction, with the vacuum fan of the vacuum inlet 55 remaining energized to receive any excess insulation mixture removed with the scrubber. Again, during either the ascent or descent of the lift 20 in automatic mode, the ascent/descent rate control switch 365 may be operated to control the rate of ascent or descent, respectively. After the lift 20 and attached components reach the lowered position, it is repositioned to the lower end of another cavity and the sequence is repeated for the application of the next insulation course.

While this foregoing description and accompanying drawings are illustrative of the present invention, other variations in structure and method are possible without departing from the invention's spirit and scope.

We claim:

1. A system for spraying an insulation mixture into a cavity comprising:

a lift defining upper and lower ends, wherein the upper end of the lift is adjustably movable between lowered and raised positions;

an insulation applicator located on the lift proximal to the upper end;

a scrubber located on the lift above the insulation applicator;

a driven elevation mechanism operably associated with the lift and adjustably moving at least the upper end of the lift between the lowered and raised positions; and a control operably associated with the insulation applicator, scrubber and driven elevation mechanism;

wherein the lift comprises a plurality of extenders, each extender of the plurality located adjacent to at least one other extender, the adjacent extenders of the plurality movably connected to one another, and at least one extender of the plurality defining the upper end of the lift, the driven elevation mechanism operably associating the extenders of the plurality to one another.

2. The system of claim 1 further comprising a vacuum inlet located on the lift below the insulation applicator and operably associated with the control.

3. The system of claim 2 further comprising a gauge located on the lift for maintaining a predetermined distance between the insulation applicator and the cavity.

4. The system of claim 2 wherein the insulation applicator is movably connected to the lift and driven in a reciprocating motion

5. The system of claim 2 wherein the lift comprises a base located at the lower end and at least one extender of the plurality is supported by the base.

6. The system of claim 5 wherein the base defines a gauge for maintaining a predetermined distance between the insulation applicator and the cavity.

7. The system of claim 5 wherein each extender of the plurality comprises a stanchion, the system further comprising at least one elongated guide located between each adjacent stanchion of the plurality, the at least one guide enabling a translational movement between the adjacent stanchions.

8. The system of claim 7 wherein the driven elevation mechanism comprises a motor-driven cable assembly operably associating the stanchions of the plurality to one another.

9. The system of claim 7 wherein the driven elevation mechanism comprises a plurality of actuators operably associating the stanchions of the plurality to one another.

10. The system of claim 9 wherein the actuators are hydraulically driven.

11. The system of claim 9 wherein the actuators are pneumatically driven.

12. The system of claim 5 wherein each extender of the plurality comprises an assembly of first and second crossed links, the first and second crossed links of each assembly rotatably connected to one another at a midpoint and defining upper and lower sets of laterally opposing link ends, the link ends of at least one set of each assembly of the plurality rotatably connected to the link ends of the at least one adjacent assembly, the assembly supported by the base having the lower set of link ends operably associated with the base, the assembly defining the upper end of the lift supporting a carrier and having the upper set of link ends operably associated with the carrier.

13. The system of claim 12 wherein the driven elevation mechanism comprises at least one motor-driven machine screw threadedly associated with the link ends of at least one assembly of the plurality.

14. The system of claim 12 wherein the driven elevation mechanism comprises at least one actuator operably associating the upper and lower sets of link ends to one another of at least one assembly of the plurality.

15. The system of claim 14 wherein the at least one actuator is hydraulically driven.

16. The system of claim 14 wherein the at least one actuator is pneumatically driven.

17. The system of claim 12 wherein the driven elevation mechanism comprises at least one actuator operably associating the cross links of at least one assembly with the cross rinks of the at least one adjacent assembly.

18. A system for spraying an insulation mixture into a cavity comprising:

a lift defining upper and lower ends, wherein the upper end of the lift is adjustably movable between lowered and raised positions;

a scrubber located on the lift proximal to the upper end;

an insulation applicator located on the lift above the scrubber;

a driven elevation mechanism operably associated with the lift and adjustably moving at least the upper end of the lift between the lowered and wised positions; and a control operably associated with the insulation applicator, scrubber and driven elevation mechanism;

wherein the lift comprises a plurality of extenders, each extender of the plurality located adjacent to at least one other extender, the adjacent extenders of the plurality movably connected to one another, and at least one extender of the plurality defining the upper end of the lift, the driven elevation mechanism operably associating the extenders of the plurality to one another.

19. The system of claim 18 further comprising a vacuum inlet located on the lift below the insulation applicator and operably associated with the control.

* * * * *